United States Patent
Kakutani

(10) Patent No.: US 6,602,003 B2
(45) Date of Patent: Aug. 5, 2003

(54) IMAGE PROCESSING DEVICE, PRINT CONTROL DEVICE, IMAGE PROCESSING METHOD, AND RECORDING MEDIUM

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/149,270

(22) PCT Filed: Oct. 1, 2001

(86) PCT No.: PCT/JP01/08658
§ 371 (c)(1),
(2), (4) Date: Jun. 4, 2002

(87) PCT Pub. No.: WO02/30676
PCT Pub. Date: Apr. 18, 2002

(65) Prior Publication Data
US 2002/0181987 A1 Dec. 5, 2002

(30) Foreign Application Priority Data
Oct. 6, 2000 (JP) ........................................ 2000-308029
Sep. 14, 2001 (JP) ........................................ 2001-279915

(51) Int. Cl.[7] .............................................. B41J 11/44
(52) U.S. Cl. ............................. 400/76; 400/61; 400/70; 347/15; 347/43; 358/1.8; 358/1.9
(58) Field of Search ............................. 400/76, 70, 61; 347/15, 43; 358/1.8, 1.9

(56) References Cited

U.S. PATENT DOCUMENTS 6,099,105 A * 8/2000 Kakutani .................... 347/15
6,338,538 B1 * 1/2002 Toshiaki ..................... 347/15
6,471,317 B2 * 10/2002 Chang ........................ 347/9
6,478,400 B1 * 11/2002 Endo .......................... 347/19
2002/0063873 A1 * 5/2002 Kakutani .................... 358/1.8

FOREIGN PATENT DOCUMENTS

| EP | 0835025 A | * | 4/1998 |
| JP | 02-031562 A | * | 2/1990 |
| JP | 09-083798 A | * | 3/1997 |
| JP | 2000-253247 A | * | 9/2000 |
| JP | 2001-157055 A | * | 6/2001 |
| WO | WO 98/03341 A | * | 1/1998 |

* cited by examiner

Primary Examiner—Charles H. Nolan, Jr.
(74) Attorney, Agent, or Firm—Martine & Penilla, LLP

(57) ABSTRACT

Image data is converted into dot density data representing dot creation densities of variable size dots. The procedure converts the image data into data representing the sum of dot creation densities of a small size dot and a large size dot as the dot density data of the small size dot. The procedure also converts the image data into data representing the sum of dot creation densities of a medium size dot and the large size dot as the dot density data of the medium size dot. The procedure respectively specifies the on-off state of the small size dot and the on-off state of the medium size dot, based on the dot density data of the small size dot and the dot density data of the medium size dot. In the case where both the small size dot and the medium size dot are in the on state in an identical pixel, the procedure specifies creation of the large size dot, in place of the medium size dot and the small size dot. The technique of the present invention enables the on-off state of the large size dot to be quickly specified based on the results of specification with regard to the small size dot and the medium size dot. This arrangement enables the image data to be quickly converted into data of a specific expression format based on the on-off state of the small size dot, the medium size dot, and the large size dot.

13 Claims, 14 Drawing Sheets

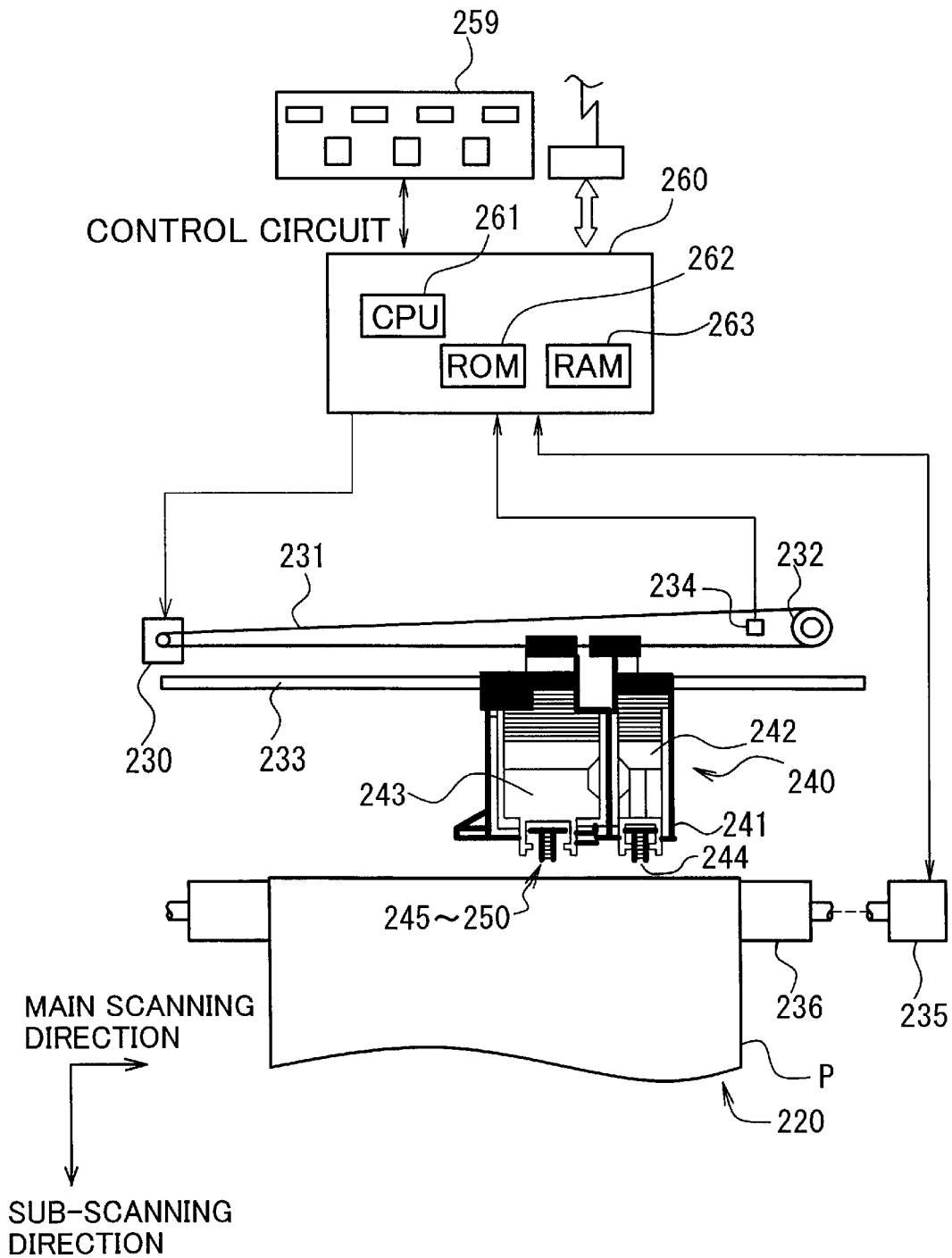

| | | C | L C | M | L M | Y | K | D Y |
|---|---|---|---|---|---|---|---|---|
| Dyes | Direct Blue 199 | 3.6 | 0.9 | | | | | 0.9 |
| | Acid Red 289 | | | 2.8 | 0.7 | | | 0.7 |
| | Direct Yellow 86 | | | | | 2.7 | | 2.7 |
| | Food Black 2 | | | | | | 4.8 | |
| Diethylene Glycol | | 30 | 35 | 20 | 25 | 30 | 25 | 35 |
| Surfinol 465 | | 1 | 1 | 1 | 1 | 1 | 1 | 1 |
| Water | | 65.4 | 63.1 | 76.2 | 73.3 | 66.3 | 69.2 | 59.7 |
| Viscosity(mPa·s) | | 3.0 | 3.0 | 3.0 | 3.0 | 3.0 | 3.0 | 3.0 |

(% by weight)

IMAGE PROCESSING DEVICE, PRINT CONTROL DEVICE, IMAGE PROCESSING METHOD, AND RECORDING MEDIUM

TECHNICAL FIELD

The present invention relates to a technique of converting tone image data into image data expressed by the on-off state of various dots.

BACKGROUND ART

An image display device that creates dots on a display medium, such as a printing medium or a liquid crystal display screen, to express an image is widely used as the output device of diverse imaging equipment. The image display device is capable of expressing only either the dot on state or the dot off state in each pixel. Adequate regulation of the dot creation densities according to the tone values of the image, however, enables expression of a multi-tone image.

In order to ensure creation of dots at the adequate densities according to the tone values of the image, the error diffusion method is widely applied to specify the dot on-off state in each pixel. The error diffusion method diffuses an error of tone expression, which arises due to creation or non-creation of a dot in each pixel of interest, into non-processed pixels that are in a neighborhood of the pixel of interest, and specifies the dot on-off state in each non-processed pixel to cancel the sum of error divisions diffused from its peripheral pixels. The error diffusion method specifies the dot on-off state to cancel the sum of error divisions and thus ensures creation of dots at the adequate densities according to the tone values of the image. Application of the error diffusion method thus enables high-quality images to be displayed by the image display device.

As the recent trend, image display devices that are capable of actively regulating the tone values expressed by the respective dots have been used widely. The tone values expressed by the respective single dots are regulated, for example, by using variable size dots or by selectively using inks of different densities for dot creation. In the image display device, regulation of the tone values expressed by the respective dots according to the tone values of the image desirably reduces the occurrence of significant errors. The error diffusion method may be applied for specification of the dot on-off state. This technique creates dots of adequate tone values according to the error divisions diffused from peripheral pixels and thereby quickly cancels the errors. In the image display device that is capable of creating variable dots having different tone values to be expressed, application of the error diffusion method for specification of the dot on-off state ensures display of images having high picture quality.

When the variable dots having different tone values to be expressed are used for printing, however, the greater number of the variable dots makes the processing more complicated. It is accordingly difficult to quickly convert the image data into data of the specific expression format based on the dot on-off state.

The object of the present invention is thus to solve the drawbacks of the prior art technique and to provide a technique of quickly converting image data into data of a specific expression format based on the on-off state of variable dots, while maintaining the sufficiently high picture quality.

DISCLOSURE OF THE INVENTION

At least part of the above and other related objects is attained by an image processing apparatus that converts image data representing a tone value of each pixel into intermediate data representing dot creation densities of variable dots, that is, a first dot, a second dot, and a third dot, which have different tone values expressed by respective single dots, and determines on-off state of each of the variable dots in each pixel based on the converted intermediate data, thereby converting the image data into dot data expressed by the on-off state of the each variable dot. The image processing apparatus includes: a first intermediate data conversion module that converts the image data into first intermediate data representing a sum of dot creation density of the first dot and dot creation density of the third dot among the variable dots; a second intermediate data conversion module that converts the image data into second intermediate data representing a sum of dot creation density of the second dot and dot creation density of the third dot among the variable dots; a first dot creation specification module that specifies the on-off state of the first dot in each pixel, based on the first intermediate data; a second dot creation specification module that specifies the on-off state of the second dot in each pixel, based on the second intermediate data; and a third dot creation specification module that specifies creation of the third dot in place of the first dot and the second dot, in a pixel where both the first dot and the second dot are specified to be in the on state.

There is an image processing method corresponding to the above image processing apparatus. The present invention is accordingly directed to an image processing method that converts image data representing a tone value of each pixel into intermediate data representing dot creation densities of variable dots, that is, a first dot, a second dot, and a third dot, which have different tone values expressed by respective single dots, and determines on-off state of each of the variable dots in each pixel based on the converted intermediate data, thereby converting the image data into dot data expressed by the on-off state of the each variable dot. The image processing method includes the steps of: converting the image data into first intermediate data representing a sum of dot creation density of the first dot and dot creation density of the third dot among the variable dots; converting the image data into second intermediate data representing a sum of dot creation density of the second dot and dot creation density of the third dot among the variable dots; specifying the on-off state of the first dot in each pixel, based on the first intermediate data; specifying the on-off state of the second dot in each pixel, based on the second intermediate data; and specifying creation of the third dot in place of the first dot and the second dot, in a pixel where both the first dot and the second dot are specified to be in the on state.

The technique of the image processing apparatus and the corresponding image processing method converts the image data into the first intermediate data and the second intermediate data, and specifies the on-off state of the first dot in each pixel based on the first intermediate data and the on-off state of the second dot in each pixel based on the second intermediate data. The technique then specifies creation of the third dot in place of the first dot and the second dot in the pixels where the first dot and the second dot are to be created in an overlapping manner. The first intermediate data and the second intermediate data are set by taking into account such replacement with another dot.

This simple technique quickly specifies the on-off state of the third dot and thereby enhances the speed of the whole processing for converting the image data into data of a specific expression format based on the on-off state of the variable dots.

In the image processing apparatus, the error diffusion method may be applied to specify the on-off state of the first dot and the second dot. The error diffusion method diffuses a tone error, which arises in each pixel of interest due to specification of the dot on-off state in the pixel, into peripheral pixels and specifies the dot on-off state in each subsequent pixel of interest to cancel the sum of error divisions diffused to the pixel, thereby ensuring a resulting image of high picture quality. The diffusion of the tone errors, however, takes some time. The preferable procedure of the present invention applies the error diffusion method for specification of the on-off state of the first dot and the second dot so as to enhance the picture quality, while specifying creation of the third dot in the pixels where the first dot and the second dot are to be created in an overlapping manner. This arrangement desirably attains both the improved picture quality and the enhanced processing speed.

In the image processing apparatus where the error diffusion method is applied to specify the on-off state of the first dot and the second dot, the third dot may be a most inconspicuous dot among the variable dots.

The third dot is created in the pixels where the first dot and the second dot are to be created in an overlapping manner by coincidence. The factor of probability is involved in creation of the third dot, so that it is difficult to regulate creation of the third dot, compared with the first dot and the second dot whose on-off state is directly specified by the error diffusion method. Even if the third dot is possibly created in a non-optimum state, the arrangement of setting the most inconspicuous dot among the variable dots to the third dot preferably minimizes the potential adverse effects on the picture quality.

In one preferable embodiment, the image processing method converts the image data into dot data of a specific expression format based on the on-off state of variable size dots, and the third dot is a largest size dot among the variable size dots.

The largest size dot among the variable size dots starts creation after the other variable size dots have been created at relatively high densities. Creation of the large size dot under such conditions does not make the large size not significantly recognizable. The largest size dot is accordingly the most inconspicuous dot among the variable size dots. Even if the third dot is possibly created in a non-optimum state, the arrangement of setting the largest size dot to the third dot preferably minimizes the potential adverse effects on the picture quality and enables the image data to be quickly converted without worsening the picture quality.

In one preferable application of the image processing apparatus, it is determined whether or not each pixel of interest is unsuitable for creation of the third dot, based on a tone value of the pixel. When one of the first dot and the second dot is specified to be in the on state in the pixel unsuitable for creation of the third dot, creation of the other of the first dot and the second dot is restricted in the pixel.

The application reduces the chance of creating the first dot and the second dot in an overlapping manner, when the pixel of interest is not suitable for creation of the third dot. This arrangement accordingly restricts creation of the third dot in the pixel of interest, thus maintaining the high picture quality.

There is another procedure alternative to the above application that, when one of the first dot and the second dot is to be created in the pixel unsuitable for creation of the third dot, restricts creation of the other of the first dot and the second dot in the pixel. The alternative procedure generally restricts creation of the other of the first dot and the second dot in each pixel of interest when one of the first dot and the second dot has been specified to be in the on state in the pixel of interest, while allowing creation of the other of the first dot and the second dot in the pixel of interest that is not unsuitable for creation of the third dot.

In the image processing apparatus of the above application, when the pixel of interest is not suitable for creation of the third dot, one preferable arrangement changes a threshold value used for specification of the dot on-off state in the error diffusion method, thus restricting creation of the second dot or the first dot.

In another preferable application of the image processing apparatus, it is determined whether or not each pixel of interest is unsuitable for creation of the third dot, based on a tone value of the pixel. When one of the first dot and the second dot is specified to be in the on state in the pixel unsuitable for creation of the third dot, creation of the other of the first dot and the second dot is prohibited in the pixel.

The application prevents the first dot and the second dot from being created in an overlapping manner, when the pixel of interest is not suitable for creation of the third dot. This arrangement accordingly prohibits creation of the third dot in the pixel of interest, thus maintaining the high picture quality.

The image processing apparatus of the present invention may have the following construction, when the image data of each color is converted into dot data expressed by the on-off state of variable dots having different sizes.

The present invention is thus directed to another image processing apparatus that converts image data representing a tone value of each pixel with regard to each of multiple colors into intermediate data representing dot creation densities of variable dots, that is, a first dot, a second dot, and a third dot, which have different tone values expressed by respective single dots, and determines on-off state of each of the variable dots in each pixel based on the converted intermediate data, thereby converting the image data into dot data expressed by the on-off state of the each variable dot with regard to each of the multiple colors. The image processing apparatus includes: a first image data conversion module that converts the image data of a first color into the dot data with regard to each of the multiple colors, where the first color is selected in advance among the multiple colors such that conspicuousness of a dot having a largest tone value expressible for each color is in an allowable range when an image is formed according to the dot data; and a second image data conversion module that converts the image data of a second color into the dot data with regard to each of the multiple colors, where the second color is selected among the multiple colors except the first color. The first image data conversion module has: a first intermediate data conversion sub-module that converts the image data of the first color into first intermediate data representing a sum of dot creation density of the first dot and dot creation density of the third dot among the variable dots, where the first dot has a smallest tone value expressed among the variable dots and the third dot has a largest tone value expressed among the variable dots; a second intermediate data conversion sub-module that converts the image data of the first color into second intermediate data representing a sum of dot creation density of the second dot and dot creation density of the third dot among the variable dots; a first dot creation specification sub-module that specifies the on-off state of the first dot in each pixel, based on the first intermediate data; a second dot creation specification sub-module that specifies the on-off state of the second dot in each pixel, based on the second intermediate data; and a third dot creation specification sub-module that specifies creation of the third dot in place of the first dot and the second dot, in a pixel where both the first dot and the second dot are specified to be in the on state. The second image data conversion module has: a variable dot intermediate data conversion sub-module that converts the image data of the second color into intermediate data representing a dot creation density of each of the variable dots or the first through the third dots; and a variable dot creation specification sub-module that specifies on-off state of each of the variable dots in each pixel, based on the intermediate data.

This image processing apparatus is provided with the first image data conversion module and the second image data conversion module. The first image data conversion module converts the image data into the first intermediate data and the second intermediate data and specifies the on-off state of the first dot and the second dot based on the first and the second intermediate data. In the pixel where the first dot and the second dot are to be created in an overlapping manner, the first image data conversion module specifies creation of the third dot in place of the first dot and the second dot. This series of processing eventually converts the image data into the dot data with regard to the first dot, the second dot, and the third dot. The second image data conversion module, on the other hand, converts the image data into the intermediate data with regard to the variable dots, the first through the third dots, and specifies the on-off state of the first through the third dots based on the intermediate data.

The first image data conversion module is used for conversion of the image data into the dot data with regard to the first color selected among the multiple colors as the specific color that makes the conspicuousness of the dots having the largest tone values to be expressed in a predetermined allowable range in a resulting image generated according to the dot data. The second image data conversion module is used, on the other hand, for conversion of the image data into the dot data with regard to the second color, which is selected among the multiple colors except the first color.

In this arrangement, with regard to the first color that makes even the dots having the largest tone values to be expressed significantly inconspicuous, the first image data conversion module is used to quickly convert the image data into the dot data. The second image data conversion module is applied for conversion of the other image data into the dot data. Unlike the first image data conversion module, the second image data conversion module specifies the dot on-off state based on the intermediate data even with regard to the dots having large tone values to be expressed, thus assuring adequate distribution of the dots having large tone values to be expressed. The cooperative use of the first image data conversion module and the second image data conversion module preferably enables the image data to be quickly and adequately converted into dot data.

In accordance with one preferable application of the image processing apparatus provided with the first image data conversion module and the second image data conversion module, the first image data conversion module converts the image data of at least one of cyan, magenta, yellow, and black, whereas the second image data conversion module converts the image data of at least one of light cyan, light magenta, and dark yellow.

Cyan, magenta, and black dots are relatively inconspicuous, since the dots having large tone values to be expressed with regard to these colors are created in darker images (having lower lightness). Yellow is an originally inconspicuous color, so that yellow dots having even large tone values to be expressed are not visually recognizable. The first image data conversion module is accordingly used for conversion of the image data of these colors and enables the image data to be quickly converted into dot data that ensures inconspicuousness of dots in a resulting image. Light cyan, light magenta, and dark yellow dots are, on the other hand, relatively conspicuous, since the dots having large tone values to be expressed with regard to these colors are created in lighter images (having higher lightness). The second image data conversion module is accordingly used for conversion of the image data of these colors and enables the image data to be converted into adequate dot data that ensures inconspicuousness of dots in a resulting image.

The image processing apparatus of the present invention is preferably applicable to a print control apparatus that outputs dot data representing controlled creation of dots to a printing device, which creates ink dots to print an image on a printing medium, and thereby controls the printing device. The image processing apparatus discussed above enables the image data to be quickly converted into dot data expressed by the on-off state of variable dots, while maintaining the sufficiently high picture quality. Application of the image processing apparatus to the print control apparatus thus preferably ensures high-speed printing of high-quality images.

The technique of the present invention may be attained by a computer program that is read and executed by the computer to actualize the image processing method discussed above. Namely another application of the present invention is a recording medium corresponding to the image processing method.

The present invention is accordingly directed to a recording medium in which a computer program is recorded. The computer program actualizes a method that converts image data representing a tone value of each pixel into intermediate data representing dot creation densities of variable dots, that is, a first dot, a second dot, and a third dot, which have different tone values expressed by respective single dots, and determines on-off state of each of the variable dots in each pixel based on the converted intermediate data, thereby converting the image data into dot data expressed by the on-off state of the each variable dot. The computer program causes a computer to attain the functions of: converting the image data into first intermediate data representing a sum of dot creation density of the first dot and dot creation density of the third dot among the variable dots; converting the image data into second intermediate data representing a sum of dot creation density of the second dot and dot creation density of the third dot among the variable dots; specifying the on-off state of the first dot in each pixel, based on the first intermediate data; specifying the on-off state of the second dot in each pixel, based on the second intermediate data; and specifying creation of the third dot in place of the first dot and the second dot, in a pixel where both the first dot and the second dot are specified to be in the on state.

The computer reads the program recorded in this recording medium to attain the respective functions discussed above. This enables the image data to be quickly converted into the specific expression format based on the dot on-off state, while maintaining the sufficiently high picture quality.

BRIEF DESCRIPTION OF THE DRAWINGS

FIG. 3 schematically illustrates the structure of a printer functioning as an image display device of the embodiment;

BEST MODES OF CARRYING OUT THE INVENTION

Figure 1:
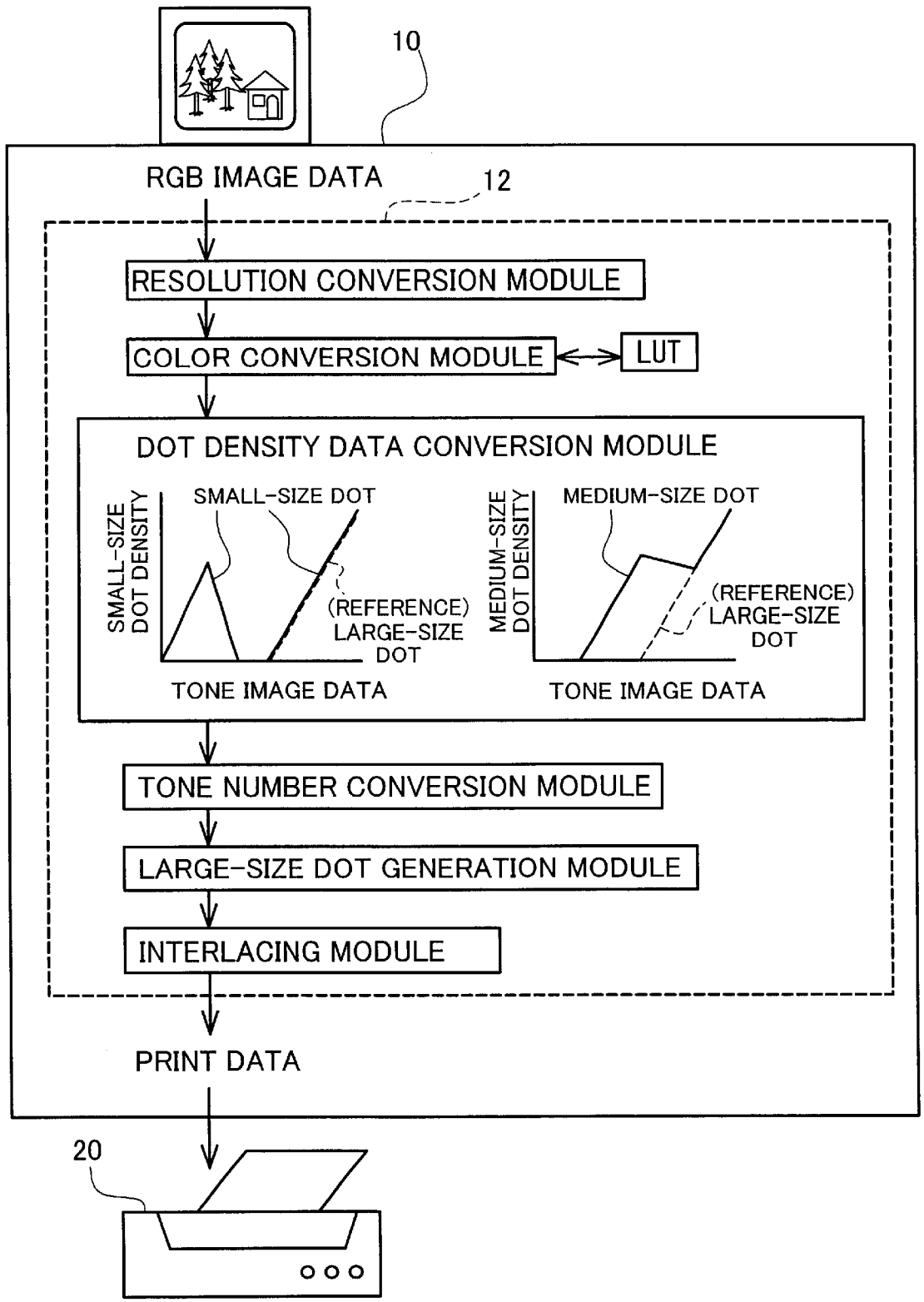
FIG. 1 schematically illustrates the structure of a printing system in one embodiment.

With a view to further clarifying the functions and the effects of the present invention, one mode of carrying out the present invention is discussed below in the following sequence:

A. Mode of Carrying Out Invention
B. Construction of Apparatus
C. Image Data Conversion Process
C-1. Dot Density Data Conversion Process
C-2. Tone Number Conversion Process
C-3. Large Size Dot Generation Process
D. Modifications
D-1. First Modified Example
D-2. Second Modified Example
D-3. Third Modified Example A. Mode of Carrying Out Invention One mode of carrying out the present invention is discussed below with reference to FIG. 1. FIG. 1 shows a printing system in one embodiment of the present invention. The printing system includes a computer 10 functioning as an image processing apparatus and a color printer 20. The computer 10 receives tone image data of an RGB color image from an imaging device like a digital camera or a color scanner and converts the input tone image data into print data expressed by the on-off state of various color dots printable in the color printer 20. A specific program called a printer driver 12 is used for such conversion of image data. The tone image data of the RGB color image data may be generated by the computer 10 according to diverse application programs.

The color printer 20 is capable of creating three variable size dots, a small size dot, a medium size dot, and a large size dot, with regard to each color. The printer driver 12 converts the input RGB image data into print data expressed by the on-off state of the small size dot, the medium size dot, and the large size dot with regard to each color and supplies the converted print data to the color printer 20.

The printer driver 12 includes a plurality of modules, a resolution conversion module, a color conversion module, a dot density data conversion module, a tone number conversion module, a large size dot generation module, and an interlace module. The detailed functions of the respective modules will be discussed later. RGB image data is subjected to a predetermined series of processing executed in the resolution conversion module and the color conversion module, and is converted to intermediate data called dot density data by the dot density data conversion module. The dot density data represents the densities of dots to be created on the printing paper according to image data. A numerical table called a dot density table representing the settings of the dot density against the tone image data with regard to the variable size dots is incorporated in the dot density data conversion module. The tone image data is converted into the dot density data by referring to this table.

The color printer 20 is capable of creating the three variable size dots, the small size dot, the medium size dot, and the large size dot. The dot density table built in the dot density data conversion module, however, includes no separate setting of the dot density of the large size dot. The setting of the dot density of the large size dot is included in the settings of the dot densities of the small size dot and the medium size dot. In the dot density table built in the module, the total dot density of the small size dot and the large size dot is set as the dot density of the small size dot, whereas the total dot density of the medium size dot and the large size dot is set as the dot density of the medium size dot. Graphs shown in the dot density data conversion module of FIG. 1 conceptually show this table. The solid-line data in the left graph represents the dot density of the small size dot, and the broken-line data corresponds to the dot density of the large size dot. As clearly understood from the illustration, the dot density of the small size dot includes the dot density of the large size dot. The solid-line data in the right graph represents the dot density of the medium size dot, and the broken-line data corresponds to the dot density of the large size dot.

The subsequent tone number conversion module applies the error diffusion method to the dot density data of the small size dot and the medium size dot, which are obtained by referring to this dot density table, so as to convert the dot density data into a specific expression format based on the on-off state of the small size dot and the medium size dot. The large size dot generation module generates data expressing the on-off state of the large size dot from data expressing the on-off state of the small size dot and the medium size dot. This series of processing accordingly gives data of the specific expression format based on the on-off state of the small size dot, the medium size dot, and the large size dot.

In the printer driver 12, the image data is treated as only data of the small size dot and the medium size dot in the flow of the process up to conversion into the specific expression format based on the on-off state. This arrangement does not directly treat data of the large size dot and thereby desirably shortens the total processing time. As discussed later, a simple method is applied to generate the data expressing the on-off state of the large size dot from the data expressing the on-off state of the small size dot and the medium size dot. This desirably shortens the whole processing time in the printer driver 12. The following describes the details of the mode of carrying out the present invention, based on an embodiment.

B. Construction of Apparatus

Figure 2:
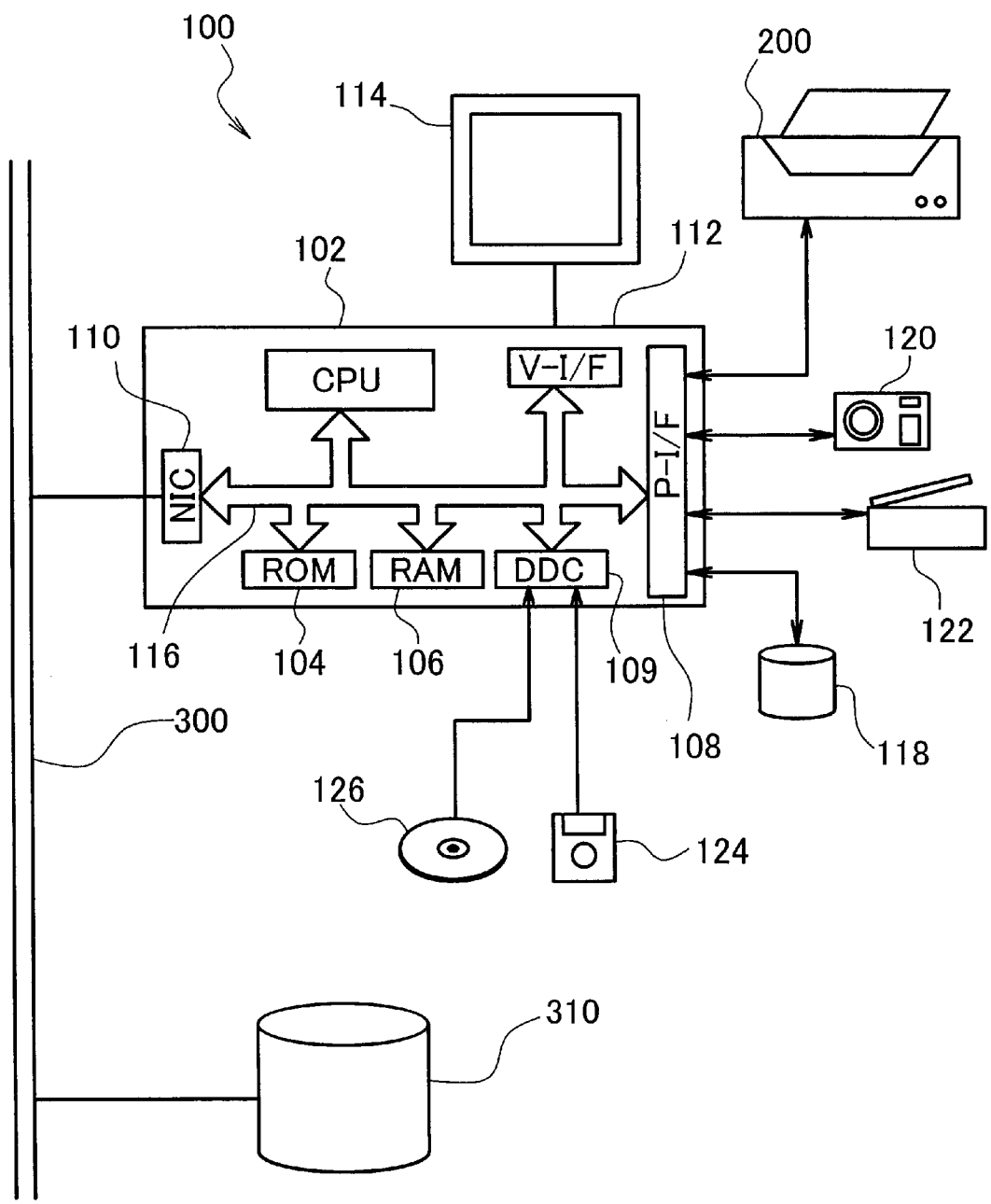
FIG. 2 shows the construction of a computer functioning as an image processing apparatus of the embodiment.

FIG. 2 shows the construction of a computer 100 functioning as an image processing apparatus of the embodiment. The computer 100 is constructed as a known computer system including a CPU 102, a ROM 104, a RAM 106, and other required constituents, which are mutually connected via a bus 116.

The computer 100 is connected to a disk controller DDC 109 that reads data from a floppy disk 124 and a compact disc 126, a peripheral equipment interface P-I/F 108 that transmits data to and from peripheral equipment, and a video interface V-I/F 112 that actuates a CRT 114. A color printer 200 and a hard disk 118 are connected to the P-I/F 108. Connection of a digital camera 120 or a color scanner 122 to the P-I/F 108 enables images taken by the digital camera 120 or the color scanner 122 to be printed. Insertion of a network interface card NIC 110 connects the computer 100 to a communication line 300 and allows the computer 100 to fetch data stored in a storage device 310 connecting with the communication line 300.

FIG. 3 schematically illustrates the structure of the color printer 200 of the embodiment. The color printer 200 is an ink jet printer that is capable of creating dots of seven different color inks, cyan ink, magenta ink, yellow ink, cyan ink having a lower dye density (light cyan ink), magenta ink having a lower dye density (light magenta ink), and yellow ink having a lower lightness (dark yellow ink), and black ink. In the description below, the cyan ink, the magenta ink, the yellow ink, the black ink, the light cyan ink, the light magenta ink, and the dark yellow ink may be respectively referred to as the C ink, the M ink, the Y ink, the K ink, the LC ink, the LM ink, and the DY ink.

As illustrated, the color printer 200 includes a mechanism of driving a print head 241 mounted on a carriage 240 for ink ejection and dot creation, a mechanism of driving a carriage motor 230 to move the carriage 240 back and forth along an axis of a platen 236, a mechanism of driving a sheet feed motor 235 to feed printing paper P, and a control circuit 260 for controlling the dot creation, the movement of the carriage 240, and the feed of the printing paper.

An ink cartridge 242 for keeping the K ink therein and an ink cartridge 243 for keeping the various color inks, the C ink, the M ink, the Y ink, the LC ink, the LM ink, and the DY ink, therein are attached to the carriage 240. In this embodiment, the K ink is kept in the ink cartridge 242, whereas the C, M, Y, LC, LM, and DY inks are kept in the ink cartridge 243. Combination of the respective color inks is, however, not restricted to this example. In one alternative example, the C, M, Y, and K inks are kept in combination in one ink cartridge, and the LC, LM, and DY inks are kept in combination in another ink cartridge. When the ink cartridges 242 and 243 are attached to the carriage 240, each ink kept in the ink cartridges flows through an ink conduit (not shown) and is supplied to corresponding one of ink ejection heads 244 through 250 provided in the lower face of the print head 241 for the respective colors. Each of the ink ejection heads 244 through 250 for the respective colors has one nozzle array including 48 nozzles Nz arranged at a fixed nozzle pitch k. The arrangement of nozzle arrays for the respective colors will be described later.

The control circuit 260 includes a CPU 261, a ROM 262, and a RAM 263, and regulates the operations of the carriage motor 230 and the sheet feed motor 235 to control main scan and sub-scan of the carriage 240, while controlling ejection of ink droplets from respective nozzles based on print data transmitted from the computer 100. Under the control of the control circuit 260, the color printer 200 creates ink dots of the respective colors at appropriate positions on the printing medium, so as to print a color image.

A diversity of techniques are applicable to ejection of ink droplets from the ink ejection heads of the respective colors. One applicable technique utilizes piezoelectric elements for ejection of ink. Another applicable technique uses a heater disposed in each ink conduit to produce bubbles in the ink conduit and thereby eject ink droplets. The printer used here is not restricted to the ink jet printer but may be a printer that utilizes the phenomenon of thermal transfer to create ink dots on the printing paper or a printer that utilizes static electricity to make toners of the respective colors adhere onto the printing medium.

Figure 4A:
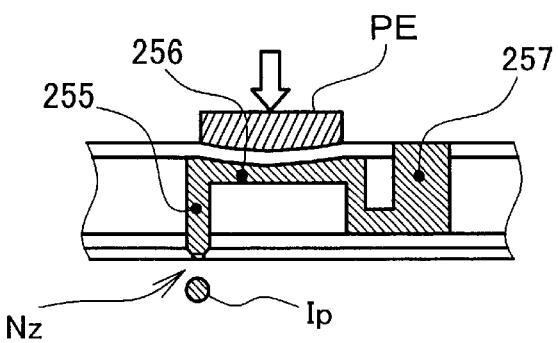
FIG. 4 shows the principle of making the printer of the embodiment generate variable size dots.

The color printer 200 regulates the size of the ejected ink droplets and thereby adjusts the size of the ink dots created on the printing paper. The color printer 200 creates ink dots of variable sizes according to the method discussed below. The discussion first regards the internal structure of a nozzle from which each color ink is ejected. FIG. 4(a) shows the internal structure of a nozzle from which each color ink is ejected. Each of the ink ejection heads 244 through 250 has a plurality of the nozzles. Each nozzle is provided with an ink conduit 255, an ink chamber 256, and a piezoelectric element PE located above the ink chamber. When the ink cartridges 242 and 243 are attached to the carriage 240, ink in the respective cartridges is supplied to the ink chamber 256 via an ink gallery 257. As is known, the piezoelectric element PE deforms its crystal structure in response to application of a voltage and carries out extremely high-speed conversion of electric energy into mechanical energy. In this embodiment, a voltage of a preset waveform is applied between electrodes provided on both the ends of the piezoelectric elements PE to deform the side wall of the ink chamber 256. Such deformation reduces the volume of the ink chamber 256 and causes a certain quantity of ink corresponding to the reduction of the volume to be ejected from the nozzle Nz as an ink droplet Ip. The ink droplets Ip is soaked in the printing paper P set on the platen 236, so as to create an ink dot on the printing paper.

Figure 4B:
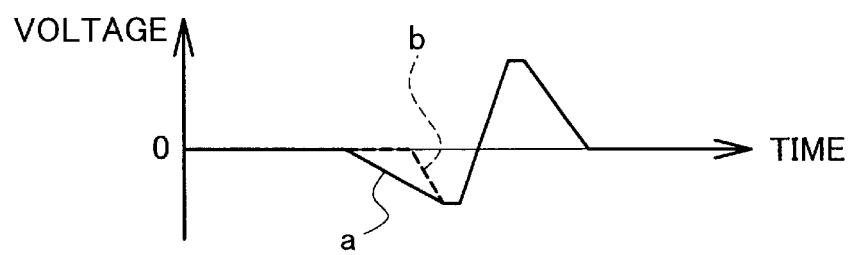

FIG. 4(b) shows the principle of varying the size of the ejected ink droplet by regulating the voltage waveform applied to the piezoelectric element PE. The process first applies a negative voltage to the piezoelectric element PE to suck ink through the ink gallery 257 into the ink chamber 256 and subsequently applies a positive pressure to the piezoelectric element PE to reduce the volume of the ink chamber and thereby cause ejection of the ink droplet Ip. An adequate ink sucking rate ensures successful inflow of ink corresponding to the variation in total volume of the ink chamber. An excessively high ink sucking rate, however, results in failed inflow of ink from the ink gallery 257, due to the flow path resistance between the ink gallery 257 and the ink chamber 256. The ink in the ink conduit 255 is thus reversely flown into the ink chamber to significantly retard the ink interface at a nozzle opening. A voltage waveform 'a' shown by the solid line in FIG. 4(b) is the waveform under the condition of ink suction at an appropriate rate. A voltage waveform 'b' shown by the broken line is the waveform under the condition of ink suction at a higher rate than the appropriate rate.

When a positive voltage is applied to the piezoelectric element PE under the condition of supplying a sufficient quantity of ink into the ink chamber 256, an ink droplet IP having a volume corresponding to the reduction of the volume of the ink chamber 256 is ejected from the nozzle Nz. In the case of application of the positive voltage under the condition of an insufficient supply of ink to significantly retard the ink interface, on the other hand, a small ink droplet is ejected. In the color printer 200 of the embodiment, the negative voltage waveform applied for ejection of the ink droplet is regulated to vary the ink sucking rate and adjust the size of the ejected ink droplet. This enables creation of ink dots of three variable sizes, that is, the large size dot, the medium size dot, and the small size dot.

The variable size dots are not restricted to these three dots, but may be a greater number of different dots. Another applicable technique causes a plurality of minute ink droplets to be ejected simultaneously and regulates the number of ink droplets simultaneously ejected to adjust the size of the ink dot created on the printing paper.

Figure 5:
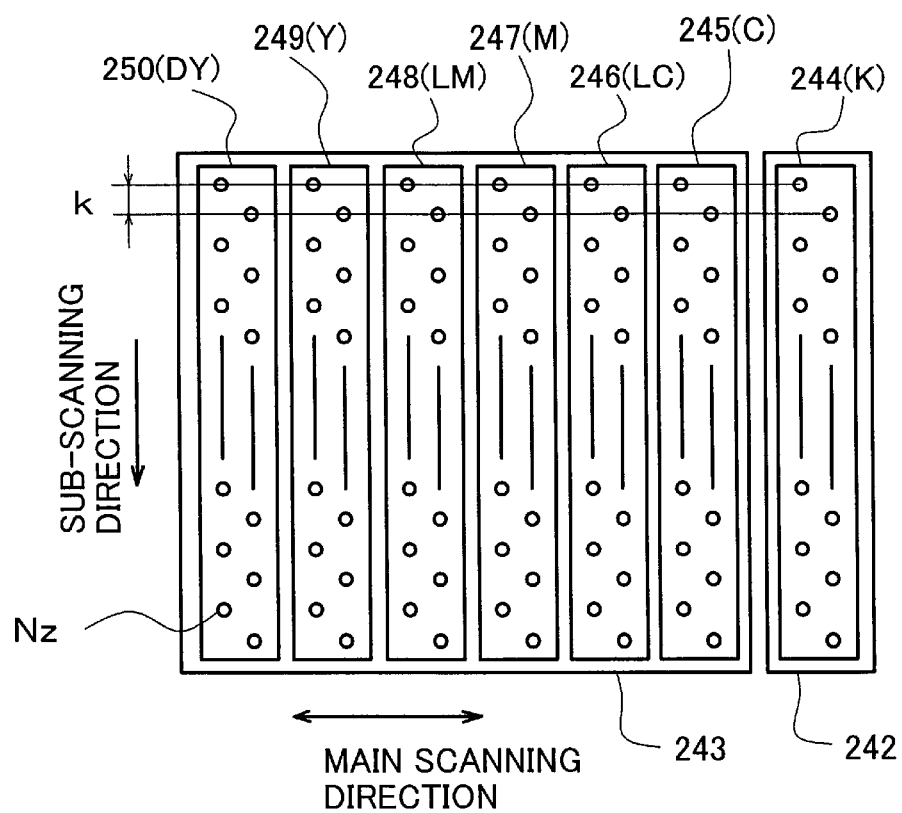
FIG. 5 shows an arrangement of nozzles on respective ink ejection heads in the embodiment.

FIG. 5 shows an arrangement of ink jet nozzles Nz in the ink ejection heads 244 through 250. As illustrated, seven nozzle arrays for ejection of the respective color inks are formed on the bottom face of the respective ink ejection heads. Each nozzle array has the nozzles Nz arranged in zigzag at a fixed nozzle pitch. The zigzag arrangement of the nozzles facilitates setting of a small value to the nozzle pitch, although the nozzles may alternatively be aligned in each nozzle array.

Figures 6, 7:
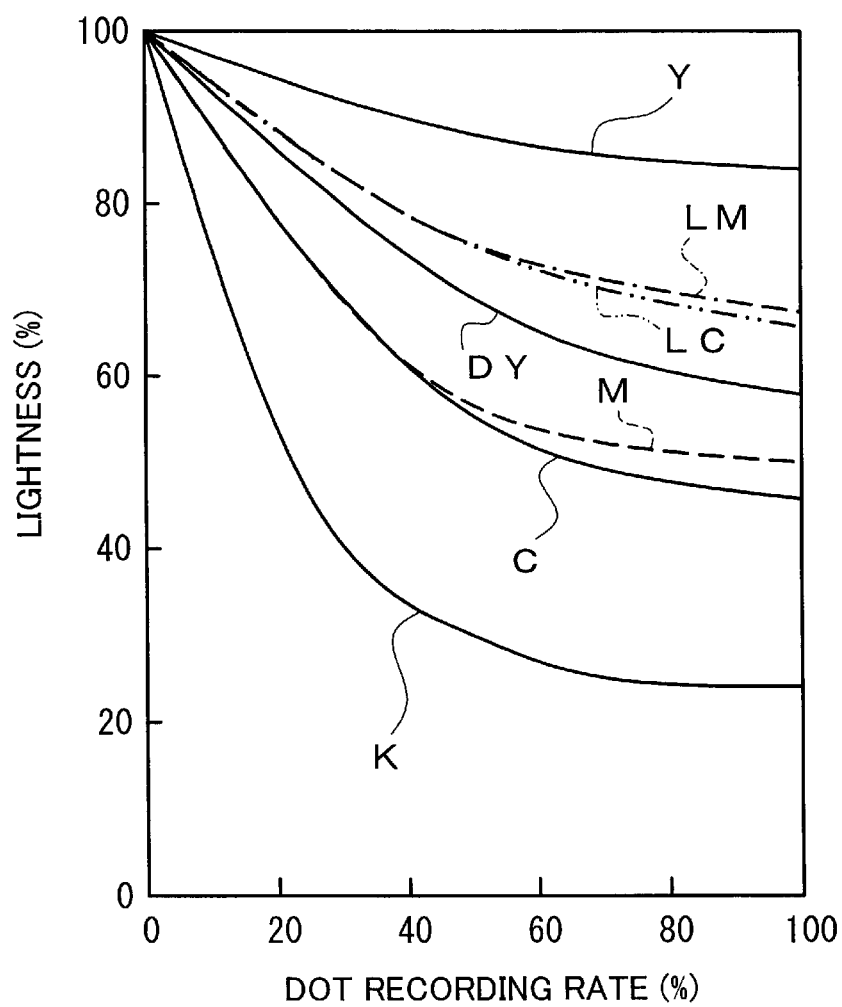
FIG. 6 shows the composition of color inks mounted on the printer of the embodiment.
FIG. 7 is a graph showing variations in lightness of the respective color inks used in the printer of the embodiment.

FIG. 6 shows an example of ink composition used in the color printer 20 of the embodiment. As shown in this table, each color ink is a solution mixture obtained by adding adequate quantities of diethylene glycol for adjustment of the viscosity and a preset dye of each color to an aqueous solution of Surfinol. The DY ink used in this embodiment is obtained by adding practically equivalent quantities of Direct Blue 199, the dye of the C ink, and Acid Red 289, the dye of the M ink, to Direct Yellow 86, the dye of the Y ink. The DY ink is not restricted to this composition, but may be obtained by varying the ratio or the respective quantities of Direct Blue 199 and Acid Red 289 or by adding a little quantity of Food Black 2, the dye of the black ink, to Direct Yellow 86.

FIG. 7 is a graph showing measurement results of lightness with regard to the respective inks having the compositions shown in FIG. 6. The dot recording rate plotted as abscissa of FIG. 7 is an indication showing the rate of dots created per unit area. For example, the dot recording rate of 100% represents the state in which dots are created in all pixels. The dot recording rate of 50% represents the state in which dots are created in half the pixels. The dot recording rate of 0% represents the state in which no dots are created in any pixels. The lightness plotted as ordinate shows brightness of the image relative to the ground color of the printing paper. For example, the lightness of 100% represents the ground color of the printing paper. The lower lightness results in decreasing the brightness of the image. As shown in the graph, in any ink, the lightness is 100% at the dot recording rate of 0%. The lightness decreases with an increase in dot recording rate, that is, with an increase in number of dots. Comparison of the brightness among images with dots of the respective color inks created at an identical dot recording rate specifies a difference in lightness among the respective color inks. As shown in the graph of FIG. 7, the DY ink having the composition of FIG. 6 is darker than the Y ink, the LC ink, and the LM ink but is lighter than the C ink, the M ink, and the K ink.

In the color printer 200 having the above hardware construction, the carriage motor 230 is driven to move the ink ejection heads 244 through 250 of the respective colors relative to the printing paper P in a main scanning direction. The sheet feed motor 235 is driven to move the printing paper P in a sub-scanning direction. The control circuit 260 actuates the nozzles at adequate timings to eject ink droplets according to print data, while repeating main scan and sub-scan of the carriage 240. The color printer 200 thus prints a resulting color image on the printing paper.

C. Image Data Conversion Process

Figure 8:
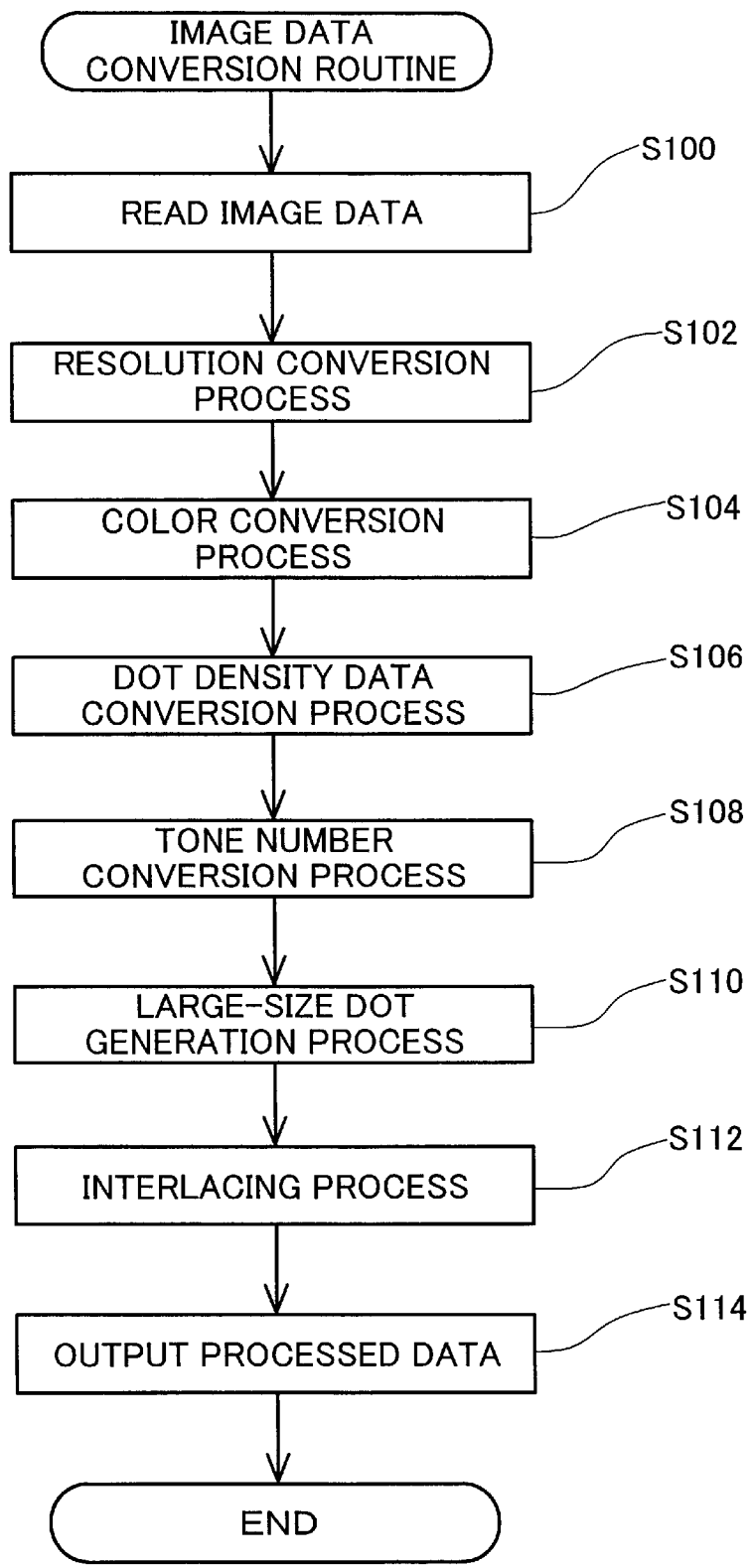
FIG. 8 is a flowchart showing an image data conversion routine executed in the image processing apparatus of the embodiment.

FIG. 8 is a flowchart showing a processing routine executed by the computer 100 as the image processing apparatus of this embodiment to make input image data subjected to a predetermined series of image processing and thereby convert the input image data into print data. This processing routine starts when the operating system of the computer 100 activates the printer driver 12. The following briefly describes the image data conversion process executed in this embodiment with reference to FIG. 8.

When the program enters the image data conversion routine, the printer driver 12 first reads RGB color image data of interest, which is to be converted (step S100), and subsequently converts the resolution of the input image data into the printing resolution used for printing with the color printer 200 (step S102). When the resolution of the color image data is lower than the printing resolution, linear interpolation is carried out to generate new data between adjoining pieces of image data. When the resolution of the color image data is higher than the printing resolution, on the other hand, the existing image data is skipped at a predetermined rate. Either process converts the resolution of the image data into the printing resolution.

After the conversion of the resolution, the printer driver 12 carries out color conversion of the color image data (step S104). The color conversion process converts the color image data expressed by a combination of the R, G, and B tone values into image data expressed by a combination of the tone values of the respective colors C, M, Y, K, LC, LM, and DY used in the color printer 200. The color conversion is quickly implemented by referring to a three-dimensional numerical table called a color conversion table (LUT).

C-1. Dot Density Data Conversion Process

A dot density data conversion process starts (step S106), subsequent to the color conversion process. This process converts the color-converted image data into dot density data with regard to the respective dots, which can be created on the printing paper by the printer. This conversion is quickly implemented by referring to the numerical table called the dot density table, as described previously.

Figure 9A:
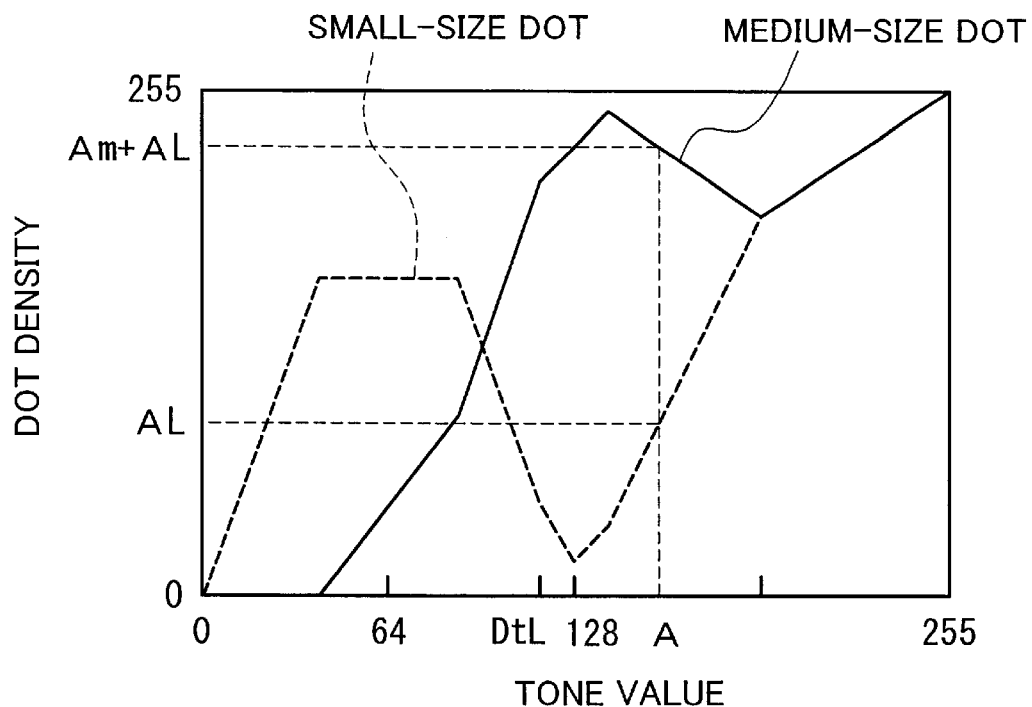
FIG. 9 shows settings of a table, which is referred to in a dot density data conversion process.

FIG. 9(a) conceptually shows a dot density table, which is referred to for conversion of the color-converted image data into the dot densities. In the dot density table, the dot densities of the small size dot and the medium size dot are set against the tone values of the respective colors C, M, Y, K, LC, LM, and DY. As described previously, the color printer 200 of the embodiment is capable of creating the large size dot, in addition to the small size dot and the medium size dot. The dot density of the large size dot is not specified separately, but is included in the dot density of the small size dot and the dot density of the medium size dot. This is explained with reference to FIG. 9(b).

Figure 9B:
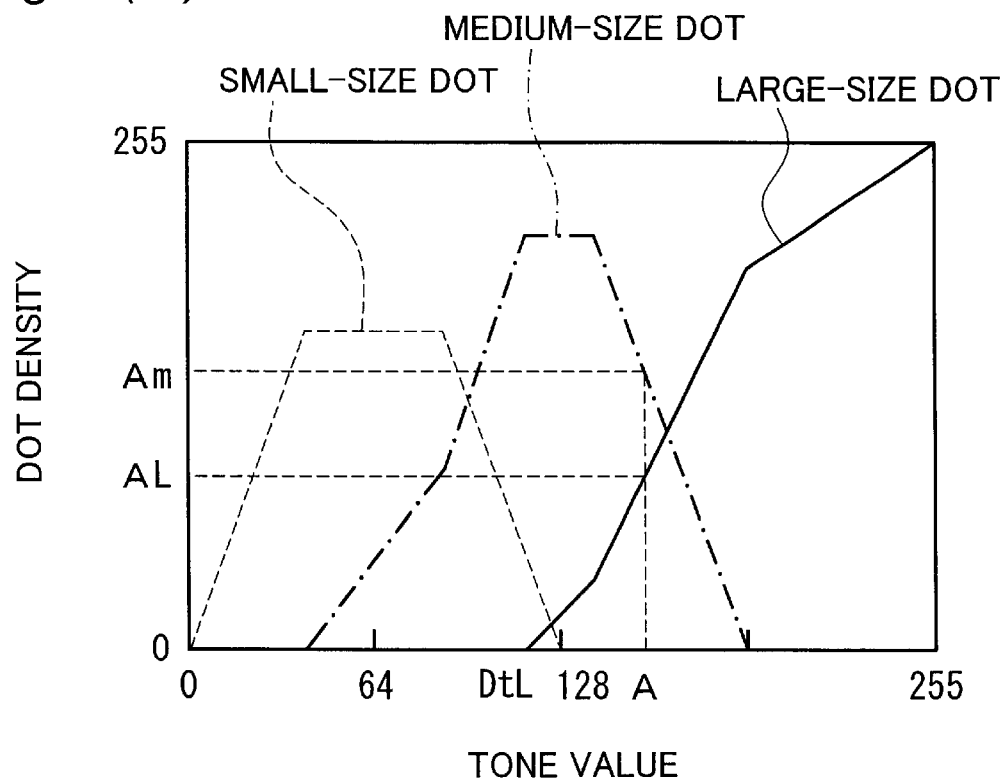

FIG. 9(b) shows a dot density table in which the dot densities of the small size dot, the medium size dot, and the large size dot are set against the tone values of the image. This dot density table specifies the required dot densities of the respective dots corresponding to each tone value of the image data. For example, at a tone value A of the image data, the medium size dot and the large size dot should be created respectively at a dot density Am and at a dot density AL. Since the dot density of the small size dot is 0 at the tone value A, no small size dot is created.

In the dot density table of the embodiment shown in FIG. 9(a), on the other hand, the sum of the required density of the medium size dot and the required density of the large size dot is set as the dot density of the medium size dot. The sum of the required density of the small size dot and the required density of the large size dot is set as the dot density of the small size dot. For example, at the tone value A, the sum Am+AL of the required density of the medium size dot (Am in FIG. 9(b)) and the required density of the large size dot (AL in FIG. 9(b)) is set as the dot density of the medium size dot. Since the required density of the small size dot is 0 at the tone value A, the required density of the large size dot (AL in FIG. 9(b)) is set as the dot density of the small size dot.

The processing of step S106 in FIG. 8 refers to such a dot density table and converts the color-converted image data of the respective colors into dot density data of the small size dot and dot density data of the medium size dot.

For convenience, in the above description, it is assumed that the total of the dot density of the small size dot and the dot density of the large size dot in FIG. 9(b) is perfectly coincident with the setting of the dot density of the small size dot in FIG. 9(a). Similarly it is assumed that the total of the dot density of the medium size dot and the dot density of the large size dot in FIG. 9(b) is perfectly coincident with the setting of the dot density of the medium size dot in FIG. 9(a). The setting may, however, not be identical with the total. For example, in an area of the image data having large tone values, a little larger value may be set to the dot density of the small size dot or to the dot density of the medium size dot. This arrangement preferably compensates for the probable non-overlapped creation of the small size dot and the medium size dot in the area where the large size dot is to be created.

C-2. Tone Number Conversion Process

On completion of the dot density data conversion process, the program proceeds to a tone number conversion process (step S108) as discussed below. The dot density data is expressed as data having 256 tones in a tone value range of 0 to 255. In practice, however, the dot is set either in 'on' state or in 'off' state to be created or non-created on the printing paper. It is accordingly required to convert the dot density data having 256 tones into 2-tone data representing the dot on-off state. The tone number conversion process thus converts the dot density data of 256 tones into image data representing the dot on-off state. More specifically, the tone number conversion process of this embodiment receives the dot density data of the small size dot and the dot density data of the medium size dot and converts the input data into image data representing the on-off state of the small size dot and the medium size dot.

Figure 10:
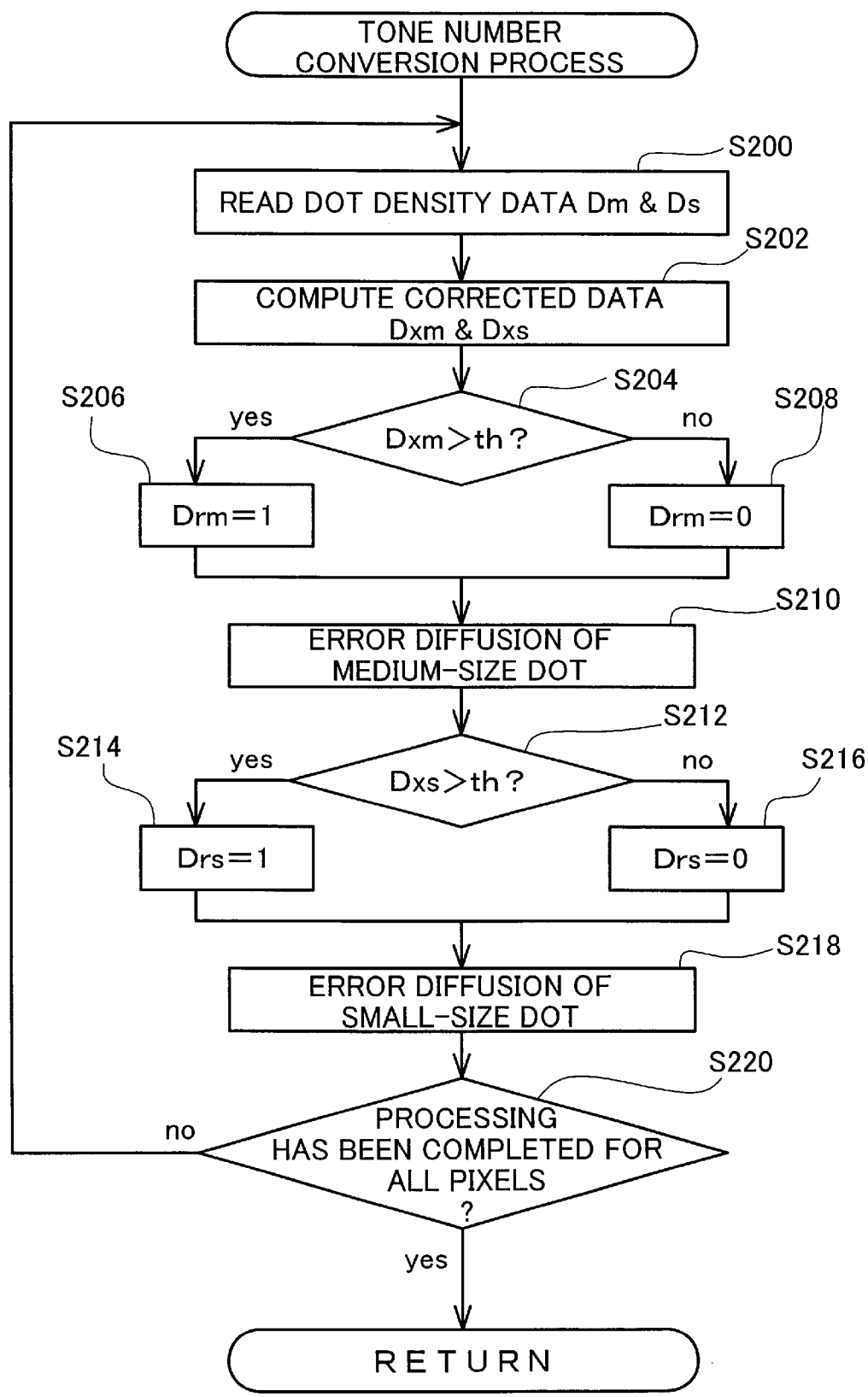
FIG. 10 is a flowchart showing a tone number conversion routine.

FIG. 10 is a flowchart showing the details of the tone number conversion process. The tone number conversion process is described in detail with reference to FIG. 10. The tone number conversion process is actually carried out for each color, although the following discussion does not mention the color for simplicity of explanation.

When the tone number conversion process starts, the process first reads dot density data Dm of the medium size dot and dot density data Ds of the small size dot with regard to a pixel of interest, for which the dot on-off state is determined (step S200).

The process subsequently adds the sum of the diffused error divisions of the medium size dot diffused from peripheral pixels due to determination of the on-off state of the medium size dot and the sum of the diffused error divisions of the small size dot diffused from the peripheral pixels due to determination of the on-off state of the small size dot to the input dot density data Dm of the medium size dot and the input dot density data Ds of the small size dot with regard to the pixel of interest, so as to calculate corrected data Dxm of the medium size dot and corrected data Dxs of the small size dot (step S202). The error diffusion with regard to the medium size dot or the small size dot will be discussed later.

The corrected data Dxm of the medium size dot is compared with a predetermined threshold value th (step S204). When the corrected data Dxm of the medium size dot is greater than the threshold value th (step S204: yes), it is determined that a medium size dot is to be created in the pixel of interest. The process accordingly sets a value '1' meaning creation of the medium size dot to a variable Drm representing the determination result of the on-off state of the medium size dot (step S206). Otherwise (step S204: no) it is determined that no medium size dot is to be created in the pixel of interest. The process accordingly sets a value '0' meaning no creation of the medium size dot to the variable Drm representing the determination result of the on-off state of the medium size dot (step S208).

Figure 11:
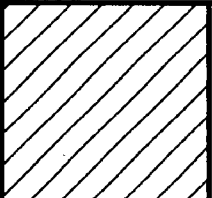
FIG. 11 shows weighting coefficients used in the process of diffusing a generated tone error into peripheral pixels.

After the determination of the on-off state of the medium size dot in the pixel of interest, the process calculates a tone error arising due to the determination and diffuses the calculated tone error (step S210). The tone value to be expressed in the pixel of interest by determining creation or no creation of the medium size dot (this tone value is referred to as a resulting value of the medium size dot) is generally different from the corrected data of the medium size dot to be expressed in the pixel of interest. The difference obtained by subtracting the resulting value of the medium size dot from the corrected data of the medium size dot is a tone error. The tone error is diffused to non-processed peripheral pixels in a neighborhood of the pixel of interest with preset weights as shown in FIG. 11. A pixel filled with the slant lines is the pixel of interest. The diffused error divisions with regard to the medium size dot, which are used for calculation of the corrected data Dxm of the medium size dot at step S202, are diffused from the peripheral pixels and accumulated in the pixel of interest.

When the determination of the dot on-off state and the error diffusion are concluded with regard to the medium size dot, a similar series of processing is carried out for the small size dot. This is described briefly. The corrected data Dxs of the small size dot is compared with the predetermined threshold value th (step S212). The corrected data Dxs of the small size dot has been calculated in advance at step S202. When the corrected data Dxs of the small size dot is greater than the threshold value th (step S212: yes), it is determined that a small size dot is not be created in the pixel of interest. The process accordingly sets the value '1' meaning creation of a dot to a variable Drs representing the determination result of the on-off state of the small size dot (step S214). Otherwise (step S212: no) it is determined that no small size dot is to be created in the pixel of interest. The process accordingly sets the value '0' meaning no creation of a dot to the variable Drs representing the result of determination (step S216). After the determination of the on-off state of the small size dot, the process carries out diffusion of a tone error arising due to the determination (step S218). More specifically, the process subtracts the resulting value of the small size dot with regard to the pixel of interest from the corrected value Dxs of the small size dot to calculate a tone error, and diffuses the calculated tone error into the peripheral pixels with the preset weights shown in FIG. 11. The diffused error divisions with regard to the small size dot, which are used for calculation of the corrected data Dxs of the small size dot at step S202, are diffused from the peripheral pixels and accumulated in the pixel of interest.

When the determination of the on-off state of the medium size dot and the small size dot is completed with regard to the pixel of interest, it is then determined whether or not the determination of the dot on-off state has been concluded for all the pixels (step S220). If there is any non-processed pixel, the program returns to step S200 and repeats the above series of processing. When the determination of the dot on-off state has been concluded for all the pixels, the program exits from this tone number conversion process and returns to the image data conversion routine of FIG. 8.

C-3. Large Size Dot Generation Process

On completion of the tone number conversion process described above, the process carries out a large size dot generation process (step S110 in FIG. 8). The color printer 200 of the embodiment is capable of creating the three variable size dots, that is, the small size dot, the medium size dot, and the large size dot, with regard to each color. The tone number conversion process described above determines only the on-off state of the small size dot and the medium size dot, but does not determine the on-off state of the large size dot. The large size dot generation process generates data representing the on-off state of the large size dot from the data representing the on-off state of the small size dot and the medium size dot as discussed below.

Figure 12:
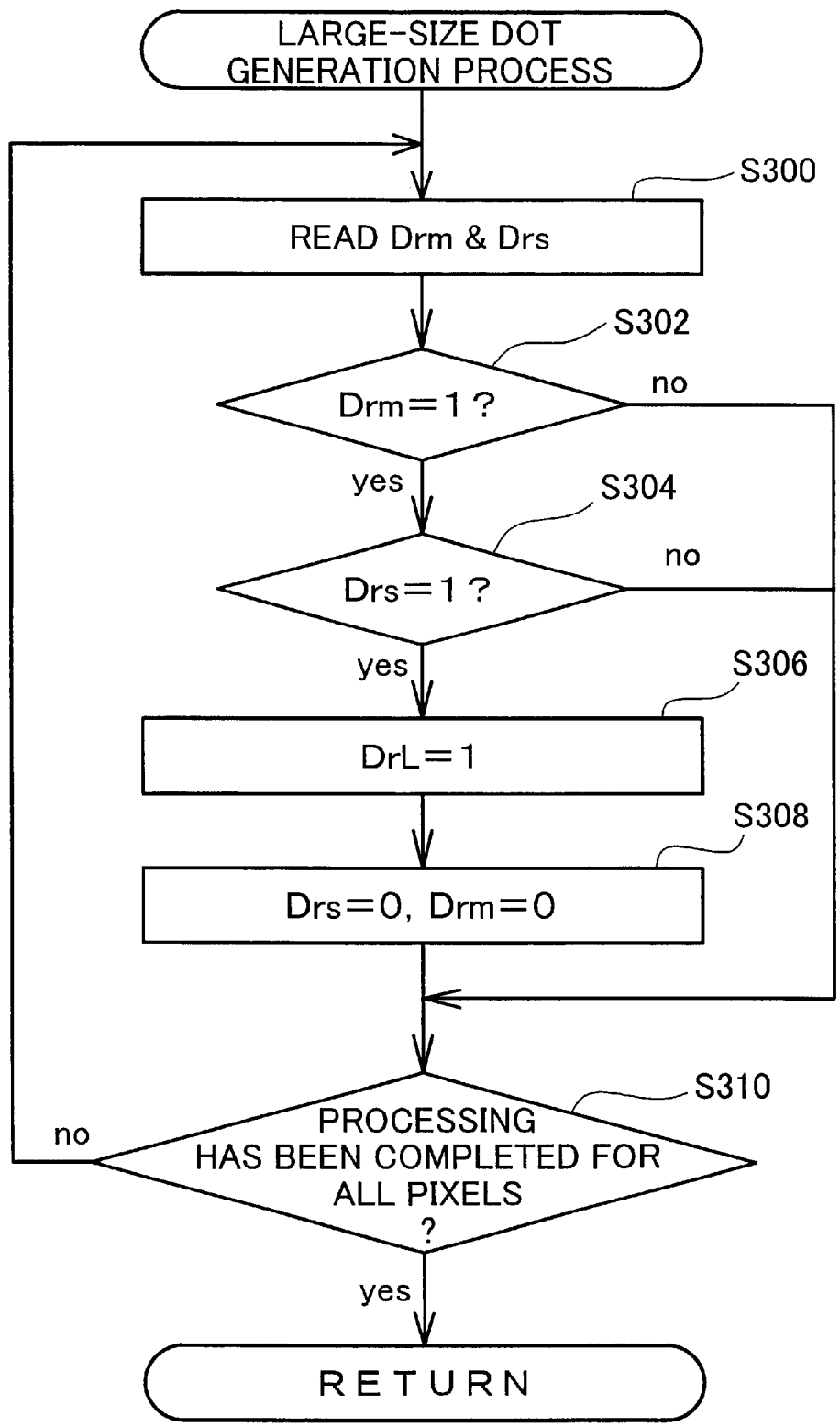
FIG. 12 is a flowchart showing a large size dot generation routine.

FIG. 12 is a flowchart showing the details of the large size dot generation process. This process is actually carried out for each color printable with the color printer 200, although the following discussion does not mention the color for simplicity of explanation.

When the large size dot generation process starts, the process first reads the determination result Drm of the on-off state of the medium size dot and the determination result Drs of the on-off state of the small size dot (step S300). The process then determines whether or not the medium size dot is to be created in the pixel of interest (step S302) and whether or not the small size dot is to be created in the pixel of interest (step S304). When both the medium size dot and the small size dot are to be created in the pixel of interest (step S302: yes and step S304: yes), it is determined that a large size dot is to be created, instead of the combined creation of the small size dot and the medium size dot. The process accordingly sets the value '1' meaning creation of a dot to a variable DrL representing the determination result of the on-off state of the large size dot (step S306). The process subsequently sets the value '0' meaning no creation of a dot to the variable Drs representing the determination result of the on-off state of the small size dot and the variable Drm representing the determination result of the on-off state of the medium size dot (step S308). This series of processing causes the large size dot to be created instead of the combination of the small size dot and the medium size dot, in the case where it is determined that the small size dot and the medium size dot are to be created in an overlapping manner in the pixel of interest. After setting the value '0' meaning no creation of a dot to the variables Drs and Drm representing the determination results, the process determines whether or not the processing has been concluded for all the pixels (step S310).

When the medium size dot is not to be created in the pixel of interest (step S302: no) or when the medium size dot is to be created but the small size dot is not to be created in the pixel of interest (step S304: no), the process does not rewrite the variables representing the determination results but immediately determines whether or not the processing has been concluded for all the pixels. If there is any non-processed pixel, the program returns to step S300 and repeats the above series of processing. When the processing has been concluded for all the pixels, the program exits from this large size dot generation process and returns to the image data conversion routine of FIG. 8.

After determination of the on-off state of the large size dot based on the determination results of the on-off state of the small size dot and the medium size dot, the printer driver starts an interlacing process (step S112). The interlacing process rearranges the image data, which is converted into the expression format based on the dot on-off state, in an order to be transferred to the color printer 200 by taking into account the sequence of dot creation. The printer driver outputs the final image data rearranged by the interlacing process to the color printer 200 as print data (step S114). The color printer 200 creates ink dots of the respective colors on the printing medium according to the print data. A resulting color image corresponding to the image data is accordingly printed on the printing paper.

As described above, the image data conversion process of this embodiment determines the on-off state of the small size dot and the medium size dot, while diffusing errors. The process detects pixels in which the small size dot and the medium size dot are to be created in an overlapping manner and specifies creation of the large size dot in lieu of the overlapped creation of the small size dot and the medium size dot. This arrangement does not require error diffusion with regard to the large size dot and readily determines the on-off state of the large size dot. The technique thus ensures quick determination of the dot on-off state with regard to all the three variable size dots, that is, the small size dot, the medium size dot, and the large size dot. This shortens the whole processing time of the image data conversion and results in quick display of the resulting image.

The tone number conversion process determines the on-off state of the small size dot and the medium size dot while diffusing errors, and specifies creation of the large size dot in place of overlapped creation of the small size dot and the medium size dot. One modified process may determine the on-off state of the medium size dot and the large size dot while diffusing errors, and specify creation of the small size dot in place of overlapped creation of the medium size dot and the large size dot. In the latter case, the sum of the dot density data of the small size dot and the medium size dot is set as the dot density data of the medium size dot. The sum of the dot density data of the small size dot and the large size dot is set as the dot density data of the large size dot.

It is desirable that an inconspicuous dot is selected as the third dot among the small size dot, the medium size dot, and the large size dot, that is, a substitutive dot that replaces overlapped creation of the other two dots. Determination of the dot on-off state with error diffusion causes the dot to be sparsely created and have a good dispersibility. The third dot is, on the other hand, created in the pixels where overlapped creation of the other two dots is determined by chance, and is thus not expected to have a good dispersibility.

The tone value expressed in each pixel by creation of a dot is generally greater than the value of the corrected data. A significant negative tone error thus arises in each pixel with a dot and is diffused into peripheral pixels. The pixel receiving the negative error division diffused thereto has a small value of the corrected data. This lowers the possibility of dot creation in the pixel. Namely determination of the dot on-off state with error diffusion into peripheral pixels lowers the possibility of dot creation in the peripheral pixels close to each pixel with a dot. This causes the dot to be dispersed and sparsely created. Unlike the other two dots, the third dot does not actively improve the dispersibility of the dot by error diffusion. The inconspicuous dot is accordingly desirable as the third dot, since the inconspicuous dot does not significantly worsen the picture quality even under the condition of a slightly poor dispersibility of the dot.

By taking into account this factor, the image data conversion process of the embodiment selects the large size dot as the third dot among the small size dot, the medium size dot, and the large size dot. As shown in FIG. 9(b), creation of the large size dot starts at the tone value where the medium size dot is created at a high density. This procedure makes the large size dot relatively inconspicuous. The slightly poor dispersibility of the large size dot accordingly minimizes the adverse effects on the picture quality.

From the viewpoint of the dot alone, the smaller dot is more inconspicuous. The small size dot may accordingly be selected as the third dot among the small size dot, the medium size dot, and the large size dot. The desirable procedure thus prints images of the respective variable size dots and selects the dot giving the highest picture quality.

D. Modifications

The image data conversion process discussed above specifies creation of the large size dot in the pixels where the small size dot and the medium size dot are to be created in an overlapping manner. There is a certain possibility that overlapped creation of the small size dot and the medium size dot in an identical pixel is determined by chance and substituted by creation of the large size dot at the tone values where use of only the small size dot and the medium size dot is expected for expressing an image and creation of the large size dot is not expected. A modified tone number conversion process discussed below controls determination of the on-off state of the small size dot and the medium size dot to prevent the large size dot from being created in the tone area where creation of the large size dot is not expected.

D-1. First Modified Example

Figure 13:
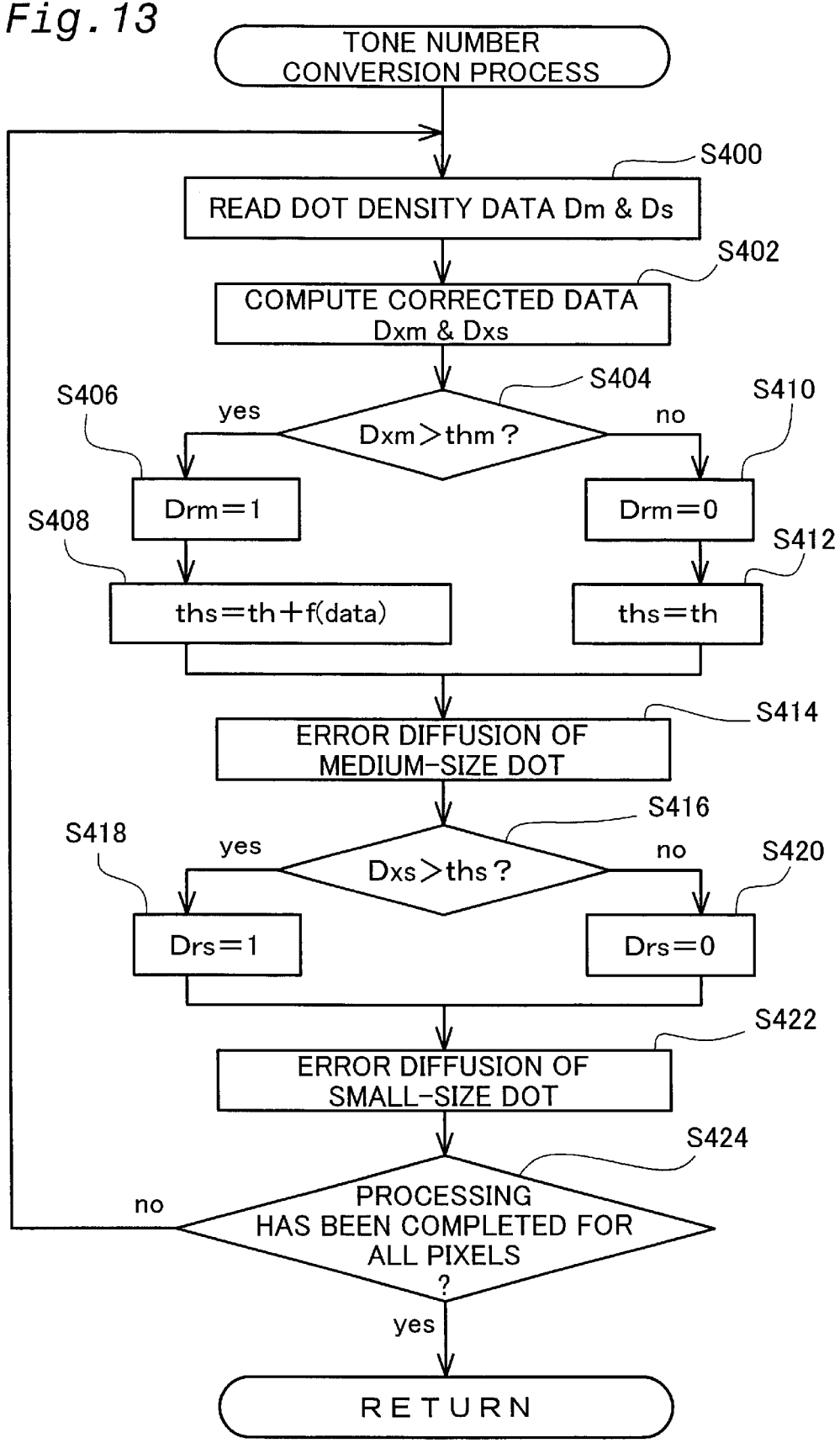
FIG. 13 is a flowchart showing a tone number conversion routine executed in a first modified example.

FIG. 13 is a flowchart showing a tone number conversion process in a first modified example. Unlike the tone number conversion process discussed previously with reference to FIG. 10, the tone number conversion process of the modified example shown in FIG. 13 sets different values to the threshold value for determination of the on-off state of the medium size dot and the threshold value for determination of the on-off state of the small size dot. The following describes the tone number conversion process of the first modified example, mainly the different part from the tone number conversion process of FIG. 10, with reference to FIG. 13.

In this modified example, the tone number conversion process first reads the dot density data Dm of the medium size dot and the dot density data Ds of the small size dot with regard to a pixel of interest, for which the dot on-off state is determined (step S400), and calculates the corrected data Dxm of the medium size dot and the corrected data Dxs of the small size dot (step S402).

The corrected data Dxm of the medium size dot is compared with a threshold value thm for the medium size dot (step S404). When the corrected data Dxm of the medium size dot is greater than the threshold value thm, it is determined that the medium size dot is to be created in the pixel of interest. The process accordingly sets the value '1' meaning creation of the medium size dot to the variable Drm representing the determination result of the on-off state of the medium size dot (step S406), and sets a threshold value ths for the small size dot (step S408).

Figure 14:
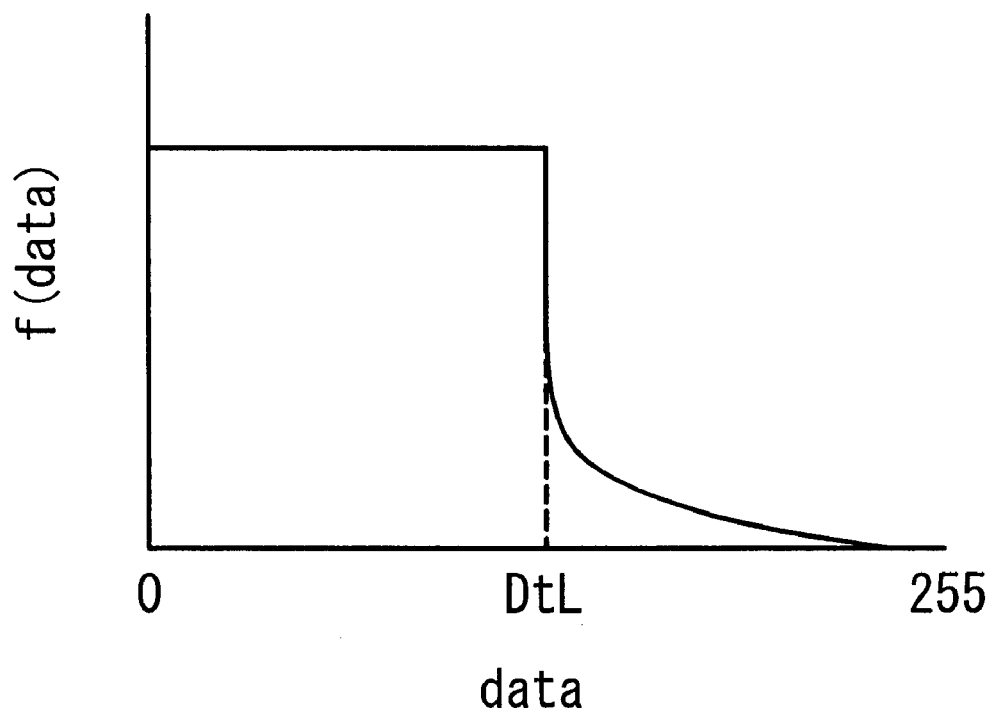
FIG. 14 shows settings of a correction coefficient used in the tone number conversion process in the first modified example.

When the determination result specifies creation of the medium size dot, the process adds a correction coefficient f(data) to a preset threshold value th and sets the sum as the threshold value ths for the small size dot. The correction coefficient f(data) is set as a function of a tone value 'data' as shown in FIG. 14. A tone value DtL shown in FIG. 14 represents the boundary of creation of the large size dot. At the smaller tone value of the image data than DtL, creation of the large size dot is not expected, but an image is expressed with only the small size dot or the medium size dot. As a reference, the tone value DtL is shown in FIGS. 9(a) and 9(b). When it is determined that the medium size dot is to be created, the process reads the image data, calculates the correction coefficient f(data), and sets the sum of the calculated correction coefficient f(data) and the preset threshold value th to the threshold value ths for the small size dot. This process is carried out at step S408 in FIG. 13. The value of the correction coefficient f(data) gently decreases in the tone value area greater than the tone value DtL. Such a gentle decrease prevents the large size dot from being abruptly created at the value of the image data close to the tone value DtL. The correction coefficient f(data) may be changed abruptly at the boundary of the tone value DtL, instead of the gradual decrease. This advantageously simplifies the process of computing the correction coefficient.

When the result of the comparison shows that the corrected data Dxm of the medium size dot is smaller than the threshold value thm for the medium size dot (step S404: no), on the other hand, it is determined that the medium size dot is not to be created in the pixel of interest. The process accordingly sets the value '0' meaning no creation of the medium size dot to the variable Drm representing the determination result of the on-off state of the medium size dot (step S410). The preset threshold value th is then set to the threshold value ths for the small size dot (step S412).

After the determination of the on-off state of the medium size dot with regard to the pixel of interest, the process calculates a tone error arising due to the determination and diffuses the calculated tone error into peripheral pixels (step S414). As discussed in the tone number conversion process, the tone error is obtained by subtracting the resulting value of the medium size dot from the corrected data of the medium size dot.

When the determination of the dot on-off state and the error diffusion are completed for the medium size dot, the determination of the on-off state of the small size dot is carried out in a similar manner. The process compares the corrected data Dxs of the small size dot with the preset threshold value ths for the small size dot (step S416). In the case where the corrected data Dxs of the small size dot is greater than the threshold value ths, it is determined that the small size dot is not be created in the pixel of interest. The process accordingly sets the value '1' meaning creation of a dot to the variable Drs representing the determination result on the small size dot (step S418). Otherwise (step S416: no) it is determined that the small size dot is not to be created in the pixel of interest. The process accordingly sets the value '0' meaning no creation of a dot to the variable Drs representing the determination result (step S420). After the determination of the on-off state of the small size dot, the process carries out error diffusion to diffuse a tone error arising due to the determination (step S422).

In the pixel of interest where creation of the medium size dot has been specified, when the tone value of the image data is smaller than the tone value DtL, a large value is set to the threshold value ths for the small size dot. This lowers the possibility of creation of the small size dot. Namely this lowers the probability of overlapped creation of the medium size dot and the small size dot in the area where creation of the large size dot is not expected.

When the determination of the on-off state of the medium size dot and the small size dot is completed with regard to the pixel of interest, it is then determined whether or not the determination of the dot on-off state has been concluded for all the pixels (step S424). If there is any non-processed pixel, the program returns to step S400 and repeats the above series of processing. When the determination of the dot on-off state has been concluded for all the pixels, the program exits from this tone number conversion process and returns to the image data conversion routine of FIG. 8.

As described above, the tone number conversion process of the first modified example sets the threshold value ths, which is used for determination of the on-off state of the small size dot, according to the determination result of the on-off state of the medium size dot. The arrangement effectively regulates the probability of overlapped creation of the small size dot and the medium size dot, that is, the probability of appearance of the large size dot. This advantageously prevents creation of the large size dot in an area where creation of the large size dot is not expected, thereby ensuring the high-quality resulting image.

D-2. Second Modified Example

The first modified example discussed above varies the threshold value ths, which is used for determination of the on-off state of the small size dot. Another applicable procedure may simply specify no creation of the small size dot when creation of the medium size dot is determined in an area where creation of the large size dot is not expected. The following describes this procedure as a tone number conversion process in a second modified example.

Figure 15:
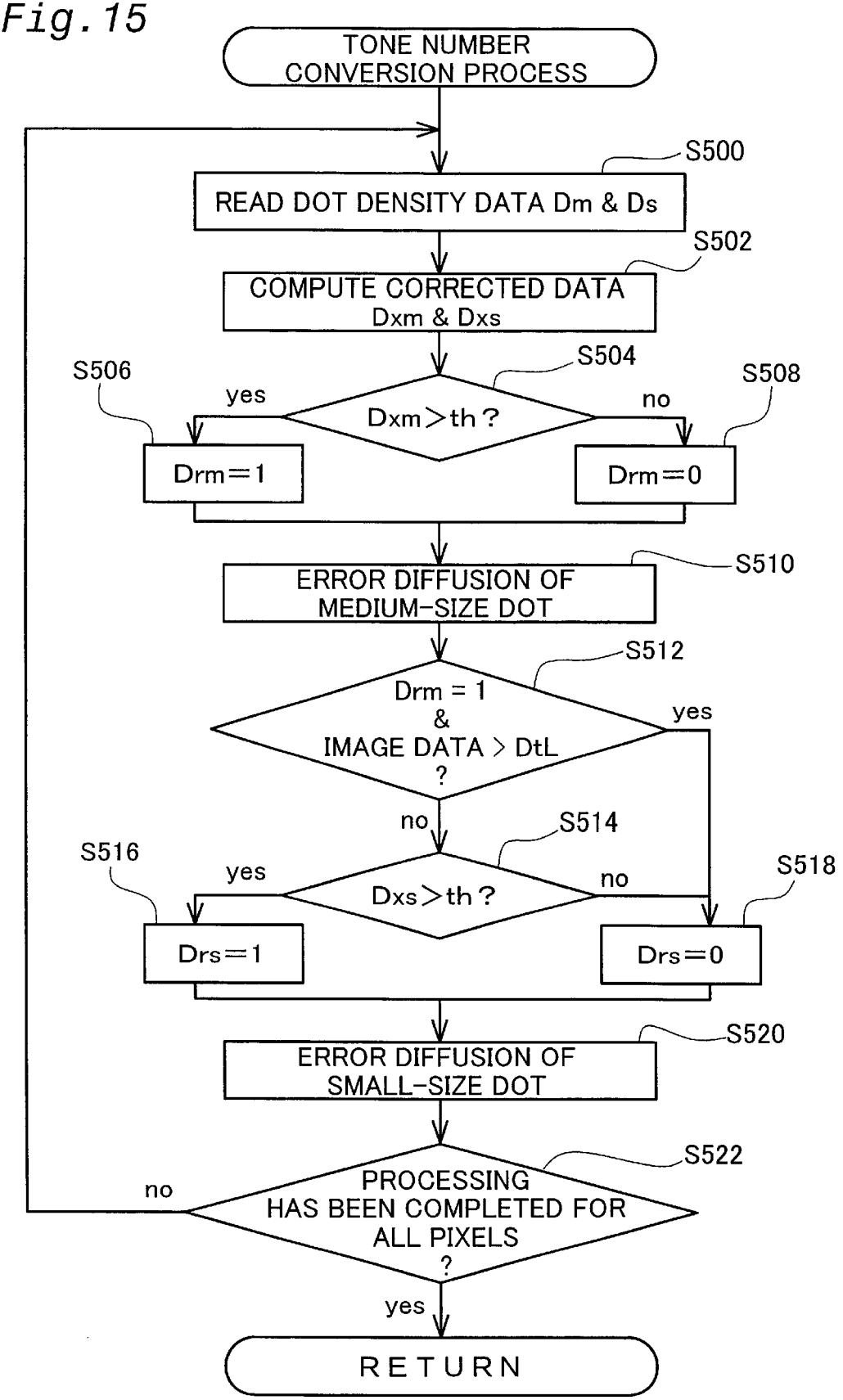
FIG. 15 is a flowchart showing a tone number conversion routine executed in a second modified example.

FIG. 15 is a flowchart showing the tone number conversion process executed in the second modified example. The following describes the tone number conversion process of the second modified example, mainly the different part from the tone number conversion process of FIG. 10, with reference to FIG. 15.

In the second modified example, the tone number conversion process first reads the dot density data Dm of the medium size dot and the dot density data Ds of the small size dot with regard to a pixel of interest, for which the dot on-off state is determined (step S500), and calculates the corrected data Dxm of the medium size dot and the corrected data Dxs of the small size dot (step S502). The corrected data Dxm of the medium size dot is compared with a preset threshold value th (step S504). When the corrected data Dxm of the medium size dot is greater than the preset threshold value th, it is determined that the medium size dot is to be created in the pixel of interest. The process accordingly sets the value '1' meaning creation of the medium size dot to the variable Drm representing the determination result of the on-off state of the medium size dot (step S506). Otherwise the value '0' meaning no creation of a dot is set to the variable Drm representing the determination result (step S508).

After the determination of the on-off state of the medium size dot with regard to the pixel of interest, the process calculates a tone error arising due to the determination and diffuses the calculated tone error into peripheral pixels (step S510). As discussed previously in the tone number conversion process of the embodiment, the tone error is obtained by subtracting the resulting value of the medium size dot from the corrected data of the medium size dot.

After diffusion of the tone error with regard to the medium size dot, it is determined whether or not the value of the determination result Drm for the medium size dot is equal to '1' and whether or not the image data in the pixel of interest is greater than the tone value DtL (step S512). Like the first modified example discussed above, creation of the large size dot starts at the tone value DtL. When the image data in the pixel of interest is greater than the tone value DtL, it means that creation of the large size dot is not expected in the currently processed area. When it is determined that the medium size dot is to be created (step S512: yes), the process immediately specifies no creation of the small size dot and sets the value '0' meaning no creation of a dot to the variable Drs representing the determination result of the on-off state of the small size dot (step S518).

When the image data in the pixel of interest is smaller than the tone value DtL or when no creation of the medium size dot is determined (step S512: no), on the other hand, the corrected data Dxs of the small size dot is compared with the preset threshold value th (step S514). In the case where the corrected data Dxs of the small size dot is greater than the preset threshold value th, it is determined that the small size dot is to be created in the pixel of interest. The process accordingly sets the value '1' meaning creation of a dot to the variable Drs representing the determination result of the on-off state of the small size dot (step S516). Otherwise it is determined that the small size dot is not to be created in the pixel of interest. The process accordingly sets the value '0' meaning no creation of a dot to the variable Drs representing the determination result (step S518). After determination of the on-off state of the small size dot, the process carries out error diffusion to diffuse a tone error arising due to the determination (step S520) and determines whether or not the processing has been concluded for all the pixels (step S522). If there is any non-processed pixel, the program returns to step S500 and repeats the above series of processing. When the determination of the dot on-off state has been concluded for all the pixels, the program exits from this tone number conversion process of the second modified example and returns to the image data conversion routine of FIG. 8.

As described above, the tone number conversion process of the second modified example immediately specifies no creation of the small size dot when creation of the medium size dot is determined in the pixel having the tone value of the image data smaller than the tone value DtL. The medium size dot and the small size dot are thus not simultaneously created in the pixel where creation of the large size dot is not expected. This arrangement advantageously prevents creation of the large size dot in the area where creation of the large size dot is not expected, thus ensuring the high-quality resulting image.

D-3. Third Modified Example

In the embodiment and its modified examples discussed above, the image data of the respective colors are subjected to the identical series of image processing. The flow of image processing may, however, be changed adequately according to the color. The following describes such processing as a third modified example.

Figure 16:
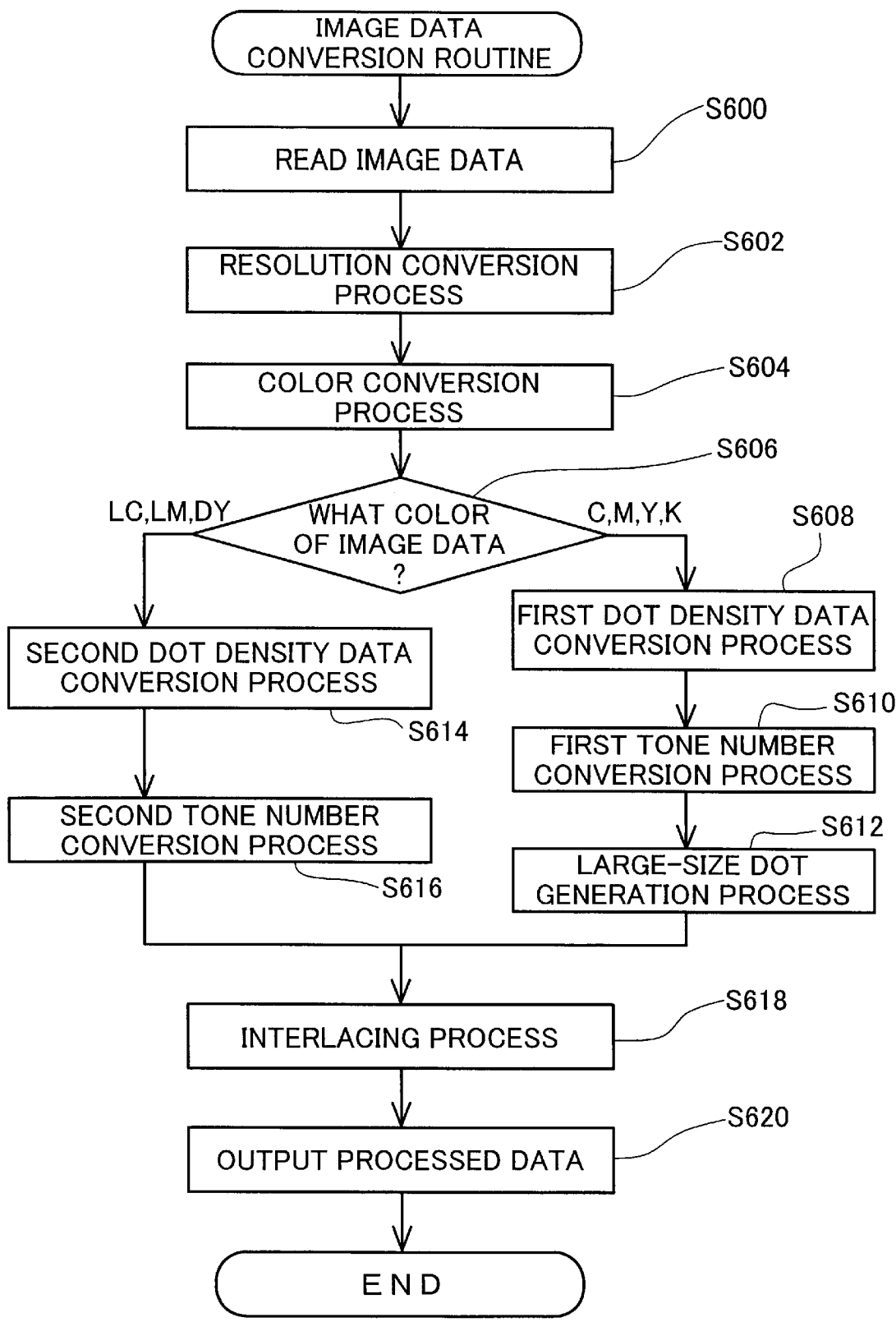
FIG. 16 is a flowchart showing an image data conversion routine executed in a third modified example.

FIG. 16 is a flowchart showing an image data conversion routine executed in the third modified example. The primary difference between the image data conversion routine of the third modified example and the image data conversion routine of the embodiment described previously with reference to FIG. 8 is that the respective processes between the color conversion process and the interlacing process are changed over according to the color of the image data. The following describes the image data conversion routine of the third modified example, especially the different part.

When the program enters the image data conversion routine of the third modified example, like the image data conversion routine of the embodiment described above, the process first reads RGB image data (step S600), and converts the resolution of the image data into the printing resolution (step S602). The process then refers to the color conversion table and carries out color conversion into data of the respective colors printable with the color printer 200 (step S604).

The process subsequently specifies the color of the converted image data (step S606). In the case of the image data of C, M, Y, or K, the process carries out a first dot density data conversion process (step S608), a first tone number conversion process (step S610), and a large size dot generation process (step S612). The first dot density data conversion process, the first tone number conversion process, and the large size dot generation process follow the series of processing in the image data conversion routine of the embodiment and are thus not specifically described here.

In the case of the image data of LC, LM, or DY, on the other hand, the process carries out a second dot density data conversion process (step S614). The second dot density data conversion process refers to another dot density table, which is different from the dot density table referred to in the first dot density data conversion process. The first dot density data conversion process refers to the dot density table shown in FIG. 9(a) and converts the image data into the data representing the density of the small size dot (dot density data) and the dot density data of the medium size dot. The second dot density data conversion process, on the other hand, refers to the dot density table shown in FIG. 9(b) and converts the image data into the dot density data of all the small size dot, the medium size dot, and the large size dot.

On completion of the second dot density data conversion process, the image data conversion routine of the third modified example shown in FIG. 16 proceeds to a second tone number conversion process (step S616). The only difference between the second tone number conversion process and the first tone number conversion process is that the tone number conversion is also carried out for the large size dot. In the first tone number conversion process, the tone number conversion is carried out only for the medium size dot and the small size dot as described previously with reference to FIGS. 10, 13, and 15. In the second tone number conversion process, on the other hand, the tone number conversion is carried out for all the variable size dots since the second dot density data conversion process at step S614 gives the dot density data of the small size dot, the medium size dot, and the large size dot. The details of the tone number conversion with regard to each variable size dot are similar to those of the first tone number conversion process and are thus not specifically described here.

As described above, the image data of LC, LM, and DY are subjected to the processing of steps S614 and S616 to be converted into the data representing the on-off state of all the variable size dots, that is, the small size dot, the medium size dot, and the large size dot. The image data of C, M, Y, and K are subjected to the processing of steps S608 and S610 to be converted into the data representing the on-off state of the small size dot and the medium size dot. The subsequent processing of step S612 causes part of the small size dot and the medium size dot to be replaced by the large size dot. This eventually implement conversion into the data representing the on-off state of all the variable size dots, the small size dot, the medium size dot, and the large size dot. In any case, after conversion of the image data into the data representing the on-off state of the variable size dots, the routine carries out the interlacing process (step S618) and outputs the resulting print data to the color printer 200 (step S620).

The image data conversion routine of the third modified example described above directly determines the on-off state of all the small size dot, the medium size dot, and the large size dot based on the dot density data with regard to the colors LC, LM, and DY. This ensures the high-quality resulting image because of the reason discussed below. The large size dots of these colors LC, LM, and DY are relatively conspicuous in the image. The dots of LC and LM are created in a relatively bright image (having high lightness), prior to creation of the dots of C and M. The large size dots of LC and LM are thus rather noticeable. The DY ink is brighter than the C, M, and K inks but not so bright as the Y ink, and thus makes the large size dot relatively conspicuous. The large size dot of the bright Y ink is hardly noticeable. The large size dot of the DY ink, which is darker than the bright Y ink, is rather noticeable. On the contrary, the image is sufficiently dark (has low lightness) under the condition that the large size dots of the darker inks C, M, and K start creation. The large size dots of C, M, and K are thus hardly conspicuous in the dark image. The DY ink is, however, not so dark as these inks, so that the large size dot of the DY ink is rather noticeable in the dark image.

The image data conversion routine of the third modified example discussed above directly determines the on-off state of the large size dot based on the dot density data with regard to the image data of the colors LC, LM, and DY, since the large size dots of these colors are relatively conspicuous in the image. This arrangement optimizes the dispersibility of the large size dot and ensures a high-quality printed image where the respective dots are less noticeable. With regard to the image data of the colors that make the large size dots relatively inconspicuous in the image, overlapped creation of the small size dot and the medium size dot is replaced by creation of the large size dot as described above. This arrangement ensures quick conversion of the image data.

The above embodiment and its modified example are to be considered in all aspects as illustrative and not restrictive. There may be many modifications, changes, and alterations without departing from the scope or spirit of the main characteristics of the present invention. For example, the software programs (application programs) attaining the above functions may be supplied to the main memory of the computer system or an external storage device via the communication line and executed. The software programs may alternatively be read from a CD-ROM or a floppy disk to be executed.

In the embodiment and its modified examples discussed above, the created dots are the three variable size dots. The technique of the present invention is also applicable to a printer that utilizes inks of different densities to create three variable density dots, the high density dot, the low density dot, the ultra low density dot, instead of the three variable size dots. The technique of the present invention is further applicable to a printer that is capable of creating variable dots having different tone values expressible per unit dot by combination of the dot size and the ink density. For example, such a printer may be capable of creating the small size dot of the low-density ink, the large size dot of the low-density ink, and the large size dot of the high-density ink.

The image display device is not restricted to the printing device that creates ink dots to print an image on the printing medium, but may be a liquid crystal display device that disperses spots at an appropriate density on the screen of a liquid crystal display to express an image of continuously varying tone.

INDUSTRIAL APPLICABILITY

As described above, the image processing apparatus, the print control apparatus, and the image processing method of the present invention ensure quick conversion of image data without deteriorating the picture quality and are thus preferably applicable to diverse image output devices. Especially preferable applications are a printing device that prints high-quality images with large sized image data and a printing device that quickly prints images without any significant deterioration of the picture quality.

What is claimed is:

1. An image processing apparatus that converts image data representing a tone value of each pixel into intermediate data representing dot creation densities of variable dots, that is, a first dot, a second dot, and a third dot, which have different tone values expressed by respective single dots, and determines on-off state of each of the variable dots in each pixel based on the converted intermediate data, thereby converting the image data into dot data expressed by the on-off state of the each variable dot, said image processing apparatus comprising:

a first intermediate data conversion module that converts the image data into first intermediate data representing a sum of dot creation density of the first dot and dot creation density of the third dot among the variable dots;

a second intermediate data conversion module that converts the image data into second intermediate data representing a sum of dot creation density of the second dot and dot creation density of the third dot among the variable dots;

a first dot creation specification module that specifies the on-off state of the first dot in each pixel, based on the first intermediate data;

a second dot creation specification module that specifies the on-off state of the second dot in each pixel, based on the second intermediate data; and a third dot creation specification module that specifies creation of the third dot in place of the first dot and the second dot, in a pixel where both the first dot and the second dot are specified to be in the on state.

2. An image processing apparatus in accordance with claim 1, wherein said first dot creation specification module and said second dot creation specification module respectively apply the error diffusion method to specify the on-off state of the first dot and the second dot.

3. An image processing apparatus in accordance with claim 2, wherein the third dot is a most inconspicuous dot among the variable dots.

4. An image processing apparatus in accordance with claim 2, wherein the variable dots are variable size dots, and the third dot is a largest size dot among the variable size dots.

5. An image processing apparatus in accordance with claim 1, said image processing apparatus further comprising:

an unsuitable pixel determination module that determines whether or not each pixel is unsuitable for creation of the third dot, based on a tone value of the pixel; and a dot creation restriction module that, when one of the first dot and the second dot is specified to be in the on state in a pixel unsuitable for creation of the third dot, restricts creation of the other of the first dot and the second dot in the pixel.

6. An image processing apparatus in accordance with claim 5, wherein said first dot creation specification module and said second dot creation specification module respectively apply the error diffusion method to specify the on-off state of the first dot and the second dot, and said dot creation restriction module sets a high threshold value used for specification of the dot on-off state by either of said first dot creation specification module and said second dot creation specification module.

7. An image processing apparatus in accordance with claim 1, said image processing apparatus further comprising:

an unsuitable pixel determination module that determines whether or not each pixel is unsuitable for creation of the third dot, based on a tone value of the pixel; and a dot creation prohibition module that, when one of the first dot and the second dot is specified to be in the on state in a pixel unsuitable for creation of the third dot, prohibits creation of the other of the first dot and the second dot in the pixel.

8. An image processing apparatus that converts image data representing a tone value of each pixel with regard to each of multiple colors into intermediate data representing dot creation densities of variable dots, that is, a first dot, a second dot, and a third dot, which have different tone values expressed by respective single dots, and determines on-off state of each of the variable dots in each pixel based on the converted intermediate data, thereby converting the image data into dot data expressed by the on-off state of the each variable dot with regard to each of the multiple colors, said image processing apparatus comprising:

a first image data conversion module that converts the image data of a first color into the dot data with regard to each of the multiple colors, where the first color is selected in advance among the multiple colors such that conspicuousness of a dot having a largest tone value expressible for each color is in an allowable range when an image is formed according to the dot data; and a second image data conversion module that converts the image data of a second color into the dot data with regard to each of the multiple colors, where the second color is selected among the multiple colors except the first color, said first image data conversion module comprising:

a first intermediate data conversion sub-module that converts the image data of the first color into first intermediate data representing a sum of dot creation density of the first dot and dot creation density of the third dot among the variable dots, where the first dot has a smallest tone value expressed among the variable dots and the third dot has a largest tone value expressed among the variable dots;

a second intermediate data conversion sub-module that converts the image data of the first color into second intermediate data representing a sum of dot creation density of the second dot and dot creation density of the third dot among the variable dots;

a first dot creation specification sub-module that specifies the on-off state of the first dot in each pixel, based on the first intermediate data;

a second dot creation specification sub-module that specifies the on-off state of the second dot in each pixel, based on the second intermediate data; and a third dot creation specification sub-module that specifies creation of the third dot in place of the first dot and the second dot, in a pixel where both the first dot and the second dot are specified to be in the on state, said second image data conversion module comprising:

a variable dot intermediate data conversion sub-module that converts the image data of the second color into intermediate data representing a dot creation density of each of the variable dots or the first through the third dots; and
a variable dot creation specification sub-module that specifies on-off state of each of the variable dots in each pixel, based on the intermediate data.

9. An image processing apparatus in accordance with claim 8, wherein the dot data converted from the image data is an expression format based on on-off state of each of the variable dots having different dot sizes,
said first image data conversion module converts the image data of at least one of cyan, magenta, yellow, and black as the image data of the first color into the dot data, and
said second image data conversion module converts the image data of at least one of light cyan, light magenta, and dark yellow as the image data of the second color into the dot data.

10. A print control apparatus that converts image data representing a tone value of each pixel into intermediate data representing dot creation densities of variable dots, that is, a first dot, a second dot, and a third dot, which have different tone values expressed by respective single dots, and determines on-off state of each of the variable dots in each pixel based on the converted intermediate data, thus converting the image data into dot data expressed by the on-off state of the each variable dot, said print control apparatus outputting the converted dot data to a printing device that creates ink dots on a printing medium to print an image and thereby controls said printing device,
said print control apparatus comprising:
a first intermediate data conversion module that converts the image data into first intermediate data representing a sum of dot creation density of the first dot and dot creation density of the third dot among the variable dots;
a second intermediate data conversion module that converts the image data into second intermediate data representing a sum of dot creation density of the second dot and dot creation density of the third dot among the variable dots;
a first dot creation specification module that specifies the on-off state of the first dot in each pixel, based on the first intermediate data;
a second dot creation specification module that specifies the on-off state of the second dot in each pixel, based on the second intermediate data;
a dot data conversion module that converts a result of specification representing the on-off state of the first dot and the second dot into the dot data in a pixel where both the first dot and the second dot are specified in the on state; and
a dot data output module that outputs the dot data to said printing device.

11. An image processing method that converts image data representing a tone value of each pixel into intermediate data representing dot creation densities of variable dots, that is, a first dot, a second dot, and a third dot, which have different tone values expressed by respective single dots, and determines on-off state of each of the variable dots in each pixel based on the converted intermediate data, thereby converting the image data into dot data expressed by the on-off state of the each variable dot,
said image processing method comprising the steps of:
converting the image data into first intermediate data representing a sum of dot creation density of the first dot and dot creation density of the third dot among the variable dots;
converting the image data into second intermediate data representing a sum of dot creation density of the second dot and dot creation density of the third dot among the variable dots;
specifying the on-off state of the first dot in each pixel, based on the first intermediate data;
specifying the on-off state of the second dot in each pixel, based on the second intermediate data; and
specifying creation of the third dot in place of the first dot and the second dot, in a pixel where both the first dot and the second dot are specified to be in the on state.

12. A recording medium in which a computer program is recorded, said computer program actualizing a method that converts image data representing a tone value of each pixel into intermediate data representing dot creation densities of variable dots, that is, a first dot, a second dot, and a third dot, which have different tone values expressed by respective single dots, and determines on-off state of each of the variable dots in each pixel based on the converted intermediate data, thereby converting the image data into dot data expressed by the on-off state of the each variable dot,
said computer program causing a computer to attain the functions of:
converting the image data into first intermediate data representing a sum of dot creation density of the first dot and dot creation density of the third dot among the variable dots;
converting the image data into second intermediate data representing a sum of dot creation density of the second dot and dot creation density of the third dot among the variable dots;
specifying the on-off state of the first dot in each pixel, based on the first intermediate data;
specifying the on-off state of the second dot in each pixel, based on the second intermediate data; and
specifying creation of the third dot in place of the first dot and the second dot, in a pixel where both the first dot and the second dot are specified to be in the on state.

13. A computer program causing a computer to actualize a method that converts image data representing a tone value of each pixel into intermediate data representing dot creation densities of variable dots, that is, a first dot, a second dot, and a third dot, which have different tone values expressed by respective single dots, and determines on-off state of each of the variable dots in each pixel based on the converted intermediate data, thereby converting the image data into dot data expressed by the on-off state of the each variable dot,
said computer program causing the computer to attain the functions of:
converting the image data into first intermediate data representing a sum of dot creation density of the first dot and dot creation density of the third dot among the variable dots;
converting the image data into second intermediate data representing a sum of dot creation density of the second dot and dot creation density of the third dot among the variable dots;
specifying the on-off state of the first dot in each pixel, based on the first intermediate data;
specifying the on-off state of the second dot in each pixel, based on the second intermediate data; and
specifying creation of the third dot in place of the first dot and the second dot, in a pixel where both the first dot and the second dot are specified to be in the on state.

* * * * *